(12) United States Patent
Bryant

(10) Patent No.: US 8,849,028 B2
(45) Date of Patent: Sep. 30, 2014

(54) COLOR SELECTION TOOL FOR SELECTING A CUSTOM COLOR COMPONENT

(75) Inventor: Andrew Bryant, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/471,475

(22) Filed: May 15, 2012

(65) Prior Publication Data
US 2013/0202203 A1 Aug. 8, 2013

Related U.S. Application Data

(60) Provisional application No. 61/595,650, filed on Feb. 6, 2012.

(51) Int. Cl.
*G06K 9/00* (2006.01)

(52) U.S. Cl.
USPC .......................................................... 382/167

(58) Field of Classification Search
None
See application file for complete search history.

(56) References Cited

U.S. PATENT DOCUMENTS

| | | | |
|---|---|---|---|
| 5,416,890 A | 5/1995 | Beretta | |
| 5,499,040 A * | 3/1996 | McLaughlin et al. | 715/823 |
| 6,362,829 B1 * | 3/2002 | Omvik et al. | 345/593 |
| 6,778,186 B2 * | 8/2004 | Mehigan | 345/596 |
| 7,006,688 B2 | 2/2006 | Zaklika et al. | |
| 7,483,083 B2 * | 1/2009 | Li et al. | 348/673 |
| 8,046,687 B2 | 10/2011 | Balassanian | |
| 2007/0195347 A1 | 8/2007 | Momose et al. | |
| 2009/0060378 A1 * | 3/2009 | Curtis | 382/274 |
| 2010/0066712 A1 * | 3/2010 | Tomonaga | 345/207 |
| 2013/0201202 A1 | 8/2013 | Bryant et al. | |
| 2013/0201203 A1 | 8/2013 | Warner | |
| 2013/0201206 A1 | 8/2013 | Bryant et al. | |
| 2013/0201207 A1 | 8/2013 | Bryant et al. | |

FOREIGN PATENT DOCUMENTS

EP 0920223 6/1999

OTHER PUBLICATIONS

Photoshop Eyedropper2007, http://web.archive.org/web/20070522031853/http://graphicssoft.about.com/od/pselements/ig/color.--7v/Info-Palette.htm.*
U.S. Appl. No. 13/471,471, filed May 15, 2012, Bryant, Andrew, et al.
U.S. Appl. No. 13/471,472, filed May 15, 2012, Warner, Peter.
U.S. Appl. No. 13/471,473, filed May 15, 2012, Bryant, Andrew, et al.
U.S. Appl. No. 13/471,474, filed May 15, 2012, Bryant, Andrew.

(Continued)

*Primary Examiner* — Bhavesh Mehta
*Assistant Examiner* — Feng Niu
(74) *Attorney, Agent, or Firm* — Adeli LLP

(57) ABSTRACT

A non-transitory machine readable medium that has a computer program for execution by at least one processing unit is described. The computer program receives a selection of a location on an image that includes several pixels. Each pixel has several color values. The computer program identifies a set of color values of a pixel that corresponds to the selected location on the image. Based on the identified set of color values, the computer program defines a custom color component that is defined by a fractional contribution from each of the plurality of primary color components of the color space. The computer program generates a response curve along the custom color component. The response curve corresponds a set of input color values of the custom color component to a set of output color values of the custom color component.

23 Claims, 28 Drawing Sheets

(56) References Cited

OTHER PUBLICATIONS

Baudisch, Patrick, "The Profile Editor: Designing a direct manipulative tool for assembling profiles," In *Proceedings of Fifth DELOS Workshop on Filtering and Collaborative Filtering*, Nov. 10-11, 1997, 7 pages, Budapest, Hungary.

Dodgson, Neil A., et al., "Contrast brushes: interactive image enhancement by direct manipulation," Computational Aesthetics in Graphics, Visualization, and Imaging, Month Unknown 2009, 8 pages, The Eurographics Association.

Pitié, François, et al., "Automated colour grading using colour distribution transfer," Computer Vision and Image Understanding, Jul. 2007, pp. 123-137, vol. 107, Issue 1-2, Elsevier Science Inc, New York, NY, USA.

Farup, Ivar, et al., "Visualization and Interactive Manipulation of Color Gamuts," Tenth Color Imaging Conference: Color Science and Engineering Systems, Technologies and Applications, Nov. 1, 2002, pp. 250-255, Scottsdale, Arizona, USA.

* cited by examiner

COLOR SELECTION TOOL FOR SELECTING A CUSTOM COLOR COMPONENT

CLAIM OF BENEFIT TO PRIOR APPLICATION

This application claims benefit to U.S. Provisional Patent Application 61/595,650, entitled "Intuitive Media Editing," filed Feb. 6, 2012. The U.S. Provisional Patent Application 61/595,650 is incorporated herein by reference.

BACKGROUND

Digital graphic design, image editing, and video editing applications (hereafter collectively referred to as media content editing applications or media editing applications) provide graphical designers, media artists, and other users with the necessary tools to view and edit a variety of media content. Examples of such applications include iPhoto®, Aperture®, Final Cut Pro® and iMovie®, all sold by Apple, Inc. These applications give users the ability to edit images and videos in a variety of manners. For example, some applications provide different range sliders for adjusting different color values of an image or in a video.

Many media editing applications, however, do not provide intuitive color adjustment controls. For example, the user is required to have extensive knowledge about color editing in order to effectively use most of the existing color adjustment tools. Furthermore, the controls for adjusting different aspects of the color values of an image are dispersed in different locations of the user interface. These deficiencies cause unnecessary inconvenience in editing an image.

BRIEF SUMMARY

Embodiments of several novel user interface (UI) tools for editing a set of images in a media editing application are described. The media editing application of some embodiments provides a color-editing tool that allows a user to create a blended bump on a tonal adjustment graph for adjusting color values of an image. A blended bump (also referred as a composite bump) is a composite of a set of basic bumps. In these embodiments, the color-editing tool of the application allows a user to create a set of basic bumps on a tonal adjustment graph. The color-editing tool blends the set of basic bumps on the graph to form a blended bump, which will be used by the media editing application to adjust the color values of the image.

The blended bump corresponds different color values within a tonal range to different adjustment values on the tonal adjustment graph. In some embodiments, the tonal range can be defined along one of the primary color components of a color space (e.g., the red component, the green component, and the blue component of a RGB color space) or along a luminance component. In these embodiments, the blended bump corresponds each color value in the primary color component (or in the luminance component) to a different adjustment value.

As mentioned above, the application of some embodiments allows a user to create a set of basic bumps on a tonal adjustment graph by providing a set of inputs on the tonal adjustment graph. Different embodiments of the application use different techniques to implement the basic bumps. In some embodiments, the basic bumps are implemented as Gaussian curves, which are bell-shaped curves. In other embodiments, the basic bumps are implemented as Bezier curves (i.e., ellipsoid-shaped curves) or step-graphs.

After the set of basic bumps is created, the media editing application of some embodiments also allows the user to modify the characteristics (e.g., height, width, etc.) of any one of the individual basic bumps in the set by providing another set of inputs on the tonal adjustment graph. This way, the tonal adjustment graph also serves as a UI tool that the user can select and manipulate. In other embodiments, the application allows the user to create and modify the basic bumps by inputting a set of values for defining the properties of the basic bumps (e.g., center location, height, and width, etc.).

After the user has created a set of basic bumps on the tonal adjustment graph, the application of some embodiments generates a blended (or composite) bump by blending (or combining) the set of basic bumps on the tonal adjustment graph. Different embodiments use different technique to blend the basic bumps. For example, the media editing application of some embodiments generates the blended bump by adding the values from all the basic bumps. That is, for each location that corresponds to a particular color value on the tonal adjustment graph, the blended bump corresponds to an adjustment value that equals to the sum of the corresponding adjustment values from each of the basic graphs. In other embodiments however, instead of taking the sum of the adjustments from each basic graph, the application of some other embodiments generates the blended bump by taking the highest (or lowest) adjustment value from the basic graphs. In some embodiments, the application uses a function that takes adjustment values from the basic graphs as inputs and generates an output adjustment value for the blended bump.

As mentioned above, the tonal range of the tonal adjustment graph can be defined along one of the primary color components or the luminance component. The application of the application of some embodiments also allow the user to define the tonal range along a custom color component that is not one of the primary color components of the color space. Specifically, a custom color component is a composite of two or more primary color components. Each of the primary color contributes a specific fraction that makes up the custom color component. In these embodiments, after the blended bump is created along the custom color component, the application breaks down the blended bump into several curves, each corresponds to a primary color component that contributes to the custom color component. The adjustment values on each divided curve depends on the specific fraction of the corresponding primary color component that makes up the custom color component. The application then uses these curves to adjust the color values of the image.

Different embodiments provide different UI tools for allowing the user to select a custom color component. For example, the application of some embodiments provides a set of range sliders that each associated with a primary color component. By adjusting the range sliders, the user can specify a particular fraction for each primary color component that contributes to the custom color component. Instead of or in addition to the range sliders, some embodiments also allow a user to specify a custom color component by selecting a location on a displayed image. The application corresponds the selected location to a particular pixel of the image, and uses the color values of the particular pixel to determine a custom color component.

The preceding Summary is intended to serve as a brief introduction to some embodiments as described herein. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments of the invention are set forth in the following figures.

DETAILED DESCRIPTION

In the following detailed description of the invention, numerous details, examples, and embodiments novel user interface tools and a media editing application are set forth and described. However, it will be clear and apparent to one skilled in the art that the invention is not limited to the embodiments set forth and that the invention may be practiced without some of the specific details and examples discussed.

The media editing application of some embodiments provides a color-editing tool that allows a user to create a blended bump on a tonal adjustment graph for adjusting color values of an image. The tonal adjustment graph is a graph that has vertical and horizontal axes (e.g., x- and y-axis) as well as curves drawn along these axes. In this application, the tonal adjustment graph may mean an area of the media editing application of some embodiments in which bumps can be drawn and plotted along the vertical and horizontal axes. The vertical axis and/or horizontal axis may not have to be displayed in the tonal adjustment graph in some embodiments.

A blended bump is a composite of a set of basic bumps. A basic bump is a curve formed by plotting values according to a function on the tonal adjustment graph. As mentioned above, a blended bump is also referred to as a composite bump because a blended bump is a composite of the basic bumps.

Figure 1:
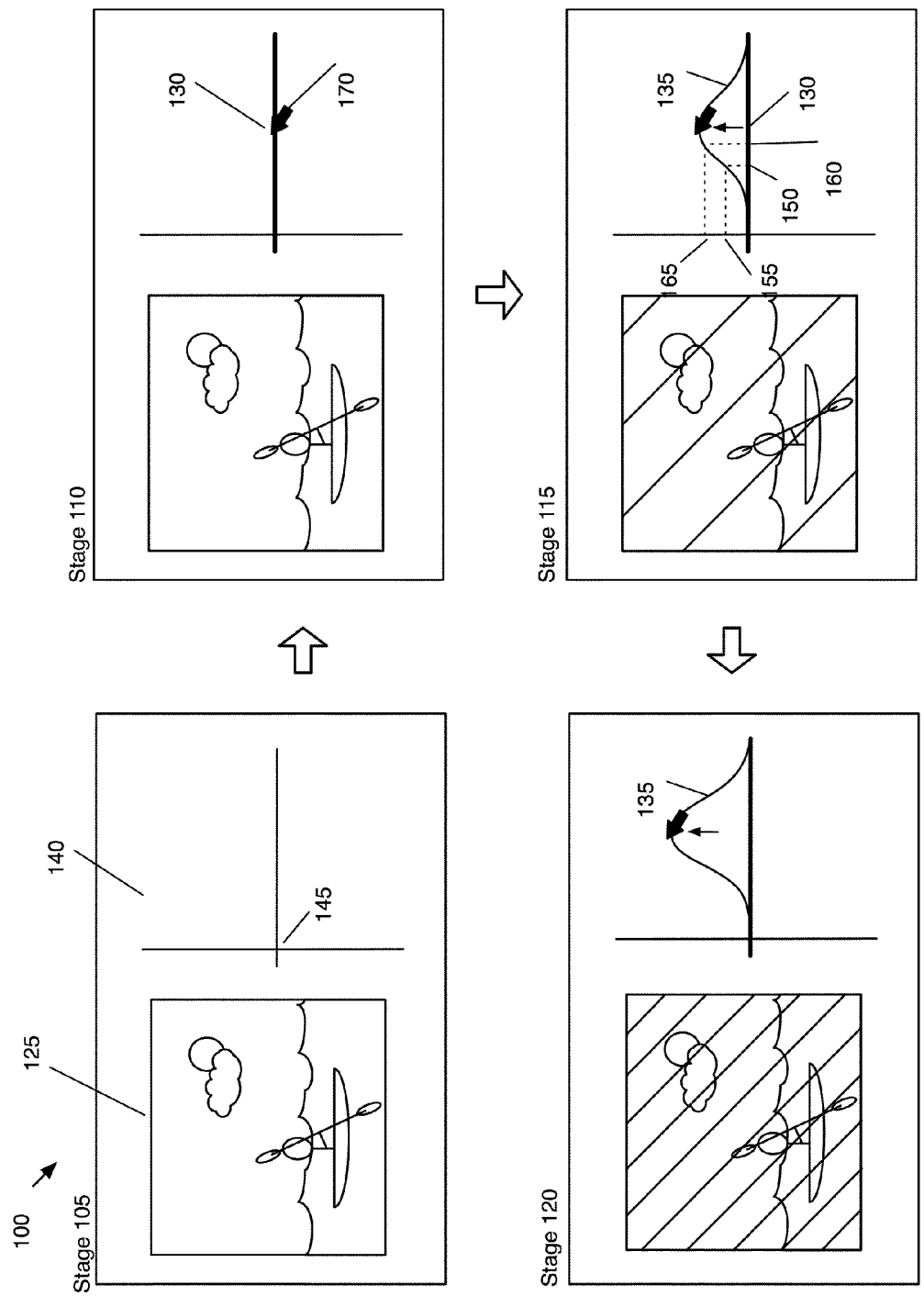
FIG. 1 illustrates an example graphical UI (GUI) of a media editing application of some embodiments that allows a user to edit an image by creating a blended bump.

FIG. 1 illustrates an example graphical UI (GUI) 100 of a media editing application of some embodiments that allows a user to edit an image by creating a blended bump on a graph at four different stages 105, 110, 115, and 120.

As shown in the first stage 105 of FIG. 1, the GUI 100 illustrates an image 125, which is a picture of a person canoeing in a sea, and a tonal adjustment graph 140. As mentioned above, a tonal range of the tonal adjustment graph 140 can be defined along any one of the primary color components of a color space or along a luminance component. In this example, the tonal adjustment graph 140 is defined along the luminance component of the color space in which the color values of the image 125 are defined.

As shown in FIG. 1, the tonal adjustment graph 140 is defined along two axes: a horizontal axis that represents different color values along the luminance component of the color space, and a vertical axis that represents different adjustment values. The far left of the horizontal axis represents a minimum luminance value (e.g., a black color). The luminance values increase from the left to the right on the horizontal axis of the tonal adjustment graph 140, and the far right of the horizontal axis represents a maximum luminance value (i.e., a white color). As such, the darker colors are represented toward the left side of the graph and the brighter colors are represented toward the right side of the graph. The mid-point 145 of the vertical axis of the tonal adjustment graph 140 represents zero adjustment. The adjustment values increases with positive adjustment values from the mid-point 145 to the top of the vertical axis, and decreases with negative adjustment values from the mid-point 145 to the bottom of the vertical axis.

Different embodiments of the application allow the user to use different methods to create a basic bump on the tonal adjustment graph 140. In some embodiments, the application allows the user to create a basic bump on the tonal adjustment graph 140 by specifying a center location and a height of the basic bump. The second stage 110 illustrates the GUI 100 when a user has specified a center location for a basic bump on the tonal adjustment graph 140. In some embodiments, the application allows the user to specify a center location of a basic bump by selecting a baseline location on the tonal adjustment graph (e.g., a location that corresponds to a particular color value along the color component). The selection of a baseline location may be performed by placing a cursor at the baseline location and providing an input (e.g., an input from a cursor controlling device or a hot key) or by performing a gesture (e.g., placing, pointing, or tapping a finger) at the baseline location on a device having a touch or near touch sensitive screen. As shown in the second stage 110, the user has specified the center location for the basic bump by placing a cursor 170 at location 130 on the horizontal axis of the tonal adjustment graph 140 and providing an input. The selection is also indicated by the highlighting of the horizontal axis of the tonal adjustment graph 140.

The third stage 115 illustrates the GUI 100 after the user has begun to specify a height for the basic bump. In some embodiments, the application allows the user to specify a height for the basic bump by providing a vector on the tonal adjustment graph. In these embodiments, the magnitude of the vector corresponds to the height of the basic bump (i.e., the larger the magnitude, the higher the basic bump). The vector can be provided by dragging a cursor in a direction on the tonal adjustment graph or by performing a gesture (e.g., dragging a finger) on a device having a touch or near touch sensitive screen that displays the tonal adjustment graph. As shown, the user has provided a vector on the tonal adjustment graph 140 by dragging the cursor 170 upward. As a result of the drag movement, the application generates a basic bump 135 on the tonal adjustment graph 140. Specifically, the basic bump 135 has a center that corresponds to the selected baseline location 130 and a height that corresponds to the user provided vector.

Different embodiments of the application generate different types of basic bumps based on the user's input on the tonal adjustment graph. In this example, the basic bump 135 generated by the application is a Gaussian curve, which is a bell-shaped curve with two sides gradually fall off from an apex of the curve. In other embodiments, the application may generate the basic bump as a Bezier curve or a step-graph. As mentioned above, the bump on the tonal adjustment graph corresponds different color values within a tonal range to different adjustment values on the tonal adjustment graph. In this example, the bump 135 corresponds different luminance values on the tonal adjustment graph 140 to different adjustment values. As shown, the bump 135 corresponds luminance value 150 to adjustment value 155, and corresponds luminance value 160 to adjustment value 165. In this example, since the entire bump 135 is located in the positive region (the region above the horizontal axis) of the tonal adjustment graph 140, the bump 135 corresponds any luminance value to a positive adjustment value. In other embodiments where the bump covers only the negative region (the region below the horizontal axis) or covers both the positive and the negative region, the bump may correspond some luminance value to negative adjustment values. In some embodiments, the application adjusts the color values of the image 125 based on the bump on the tonal adjustment graph 140. As shown, the color values of the image 125 have increased in brightness, as indicated by the diagonal lines across the image 125.

When adjusting the color values of the image 125, the application of some embodiments iteratively performs the following procedure for each pixel in the image 125. First, the application retrieves, from the pixel, a color value of the particular color component along which the tonal adjustment graph is defined. In this example, the application retrieves the luminance value from the pixel. The application then identifies a corresponding adjustment value for the retrieved color value on the tonal adjustment graph 140, and uses the adjustment value to adjust the color value of the pixel. Different embodiments use the adjustment value to adjust the color value of the pixel differently. For instance, the application of some embodiments adjusts the color value by multiplying the adjustment value to the color value. Alternatively or conjunctively, the application adjusts the color value by adding the adjustment value to the color value. In some embodiments, the application uses a function other than simple multiplication or addition. Such function would take as inputs the color value of the pixel and the adjustment value and outputs an adjusted color value.

The fourth stage 120 illustrates the GUI 100 after the user has moved the cursor further upward on the tonal adjustment graph 140. The cursor movement specifies a new height for the basic bump 135. As a result, the application adjusts the height of the bump 135 according to the new vector. The application also re-adjusts the color values of the image 125 based on the modified bump 135. As shown, the color values of the image 125 in the fourth stage 120 is shown to be brighter than the color values of the image 125 in the third stage 115, as indicated by more diagonal lines across the image 220.

Figure 2:
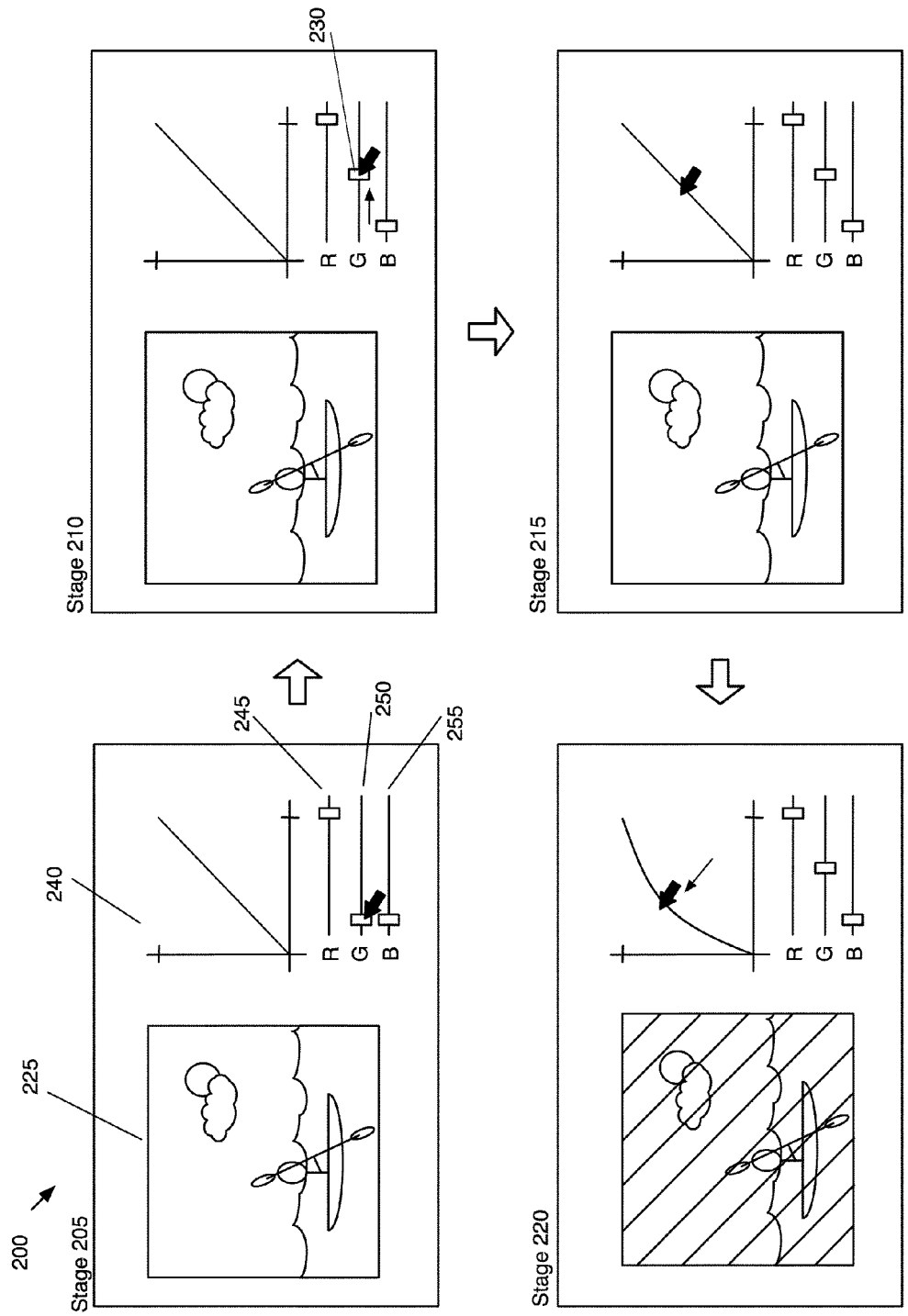
FIG. 2 illustrates a set of tools that allow the user to specify a fractional contribution of each primary color component for the custom color component.

As mentioned above, the tonal range of a tonal graph may be defined along any one of the primary color components of a color space. In some embodiments, the tonal range may also be defined along a custom color component. A custom color component is a composite of two or more primary color components. Each of the primary color contributes a specific fraction that makes up the custom color component. Different embodiments provide different interfaces for allowing a user to select a custom color component. In one approach, the application provides a set of tools (e.g., range sliders) that allow the user to specify a fractional contribution of each primary color component for the custom color component. FIG. 2 illustrates an example of such an approach. Specifically, FIG. 2 illustrates an example of selecting a custom color component for a response graph (for drawing a response curve or a color response curve) through a GUI 200 at four different stages 205, 210, 215, and 220.

As shown in FIG. 2, the GUI 200 illustrates an image 225, which is a picture of a person canoeing in a sea, a response graph 240, and a set of tools 245-255 for specifying fractional contributions of the primary color components to the custom color component. The response graph 240 is defined along two axes: a horizontal axis that specifies the original tonal values (input values) along a tonal range, with a minimum tonal value on the left and progressively larger tonal values toward the right, and a vertical axis that specifies the changed tonal values (output values), with a minimum tonal value on the bottom and progressively larger tonal values toward the top. As such, a tonal graph represents changes to the tonal scale of a color space.

In this example, the set of tools 245-255 are range sliders. Specifically, range slider 245 is for specifying a fractional contribution of a red color component, range slider 250 is for specifying a fractional contribution of a green color component, and range slider 255 is for specifying a fractional contribution of a blue color component. As shown in the first stage 205, the range slider 245 is at a maximum position (e.g., 255) while the range sliders 250 and 255 are at a minimum position (e.g., 0), indicating a pure red color component. The user can manipulate the range sliders 245-255 in order to specify different fractional contributions of the primary color component in this stage.

The second stage 210 illustrates the GUI 200 after the user has specified a custom color component. As shown, the user has moved the knob of the range slider 250 from the minimum position to the middle (e.g., 127). The movement of the range slider 250 has caused the custom color component to be changed from a pure red color component to a custom color component with one-third red and two-thirds green. That is, this custom color component is made up of red and green with the red twice as much as the green.

The third stage 215 illustrates the GUI 200 when the user begins to adjust the response curve (e.g., a color response curve) on the response graph 240 by selecting a location on the response curve. The fourth stage 220 illustrates the GUI 200 after the user has adjusted the response curve on the response graph 240. As shown, the user has adjusted the response curve by dragging the cursor toward the top left corner of the response graph 240. As a result the color values of the image 225 that corresponds to the custom color component have been modified, as indicated by the diagonal lines across the image 220.

Several more detailed embodiments of the invention are described in the sections below. Section I describes details of creating and manipulating a set of basic bumps on a tonal adjustment graph and Section II describes details of specifying a custom color component for defining a tonal range of the tonal adjustment graph. Section III illustrates the software architecture of the media editing application of some embodiments. Finally, Section IV describes an electronic system that implements some embodiments of the invention.

I. Creating and Modifying Bumps on a Tonal Adjustment Graph

Figure 3:
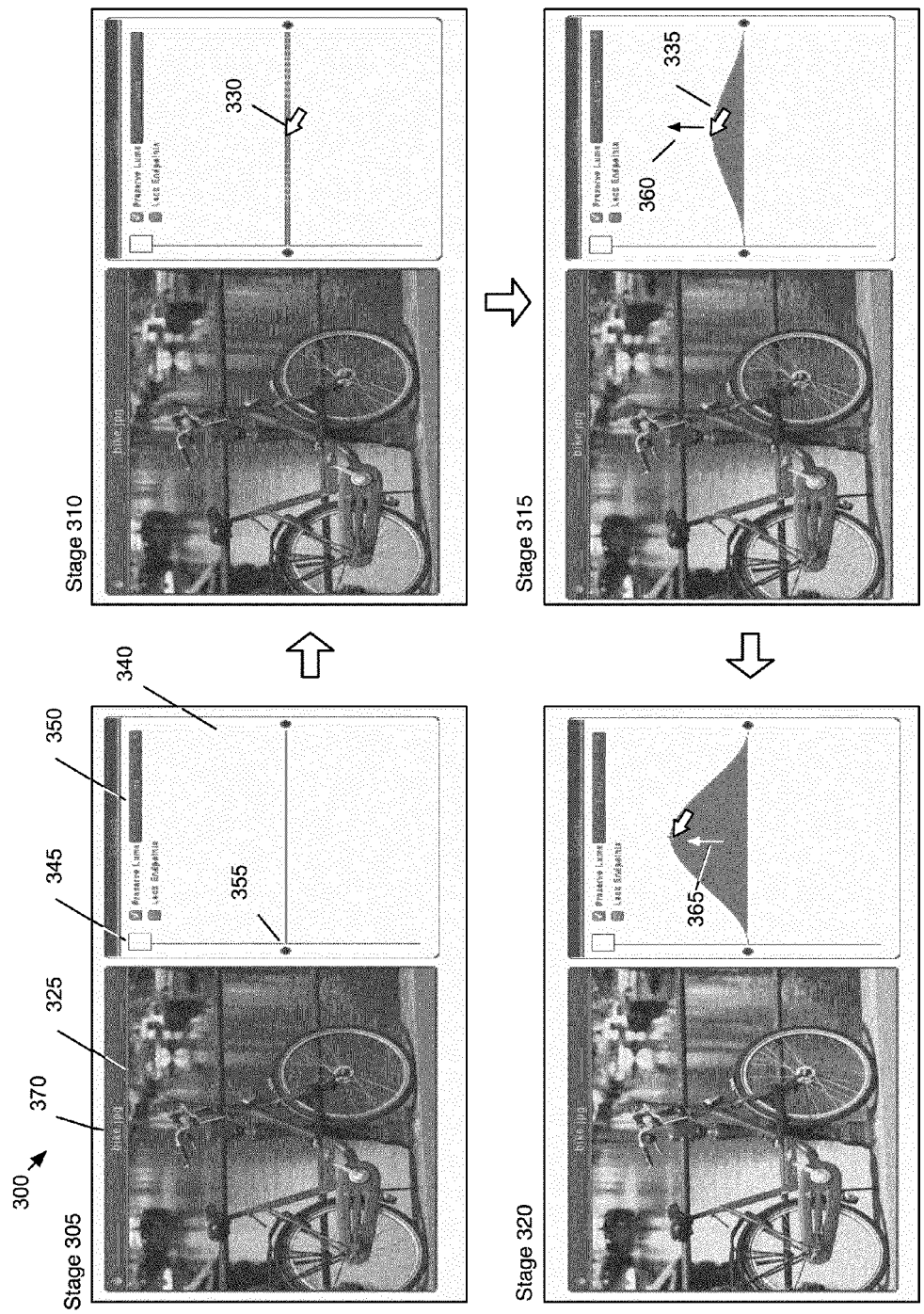
FIG. 3 illustrates an example of creating a bump on a tonal adjustment graph through a GUI.

As mentioned above, the application of some embodiments allows a user to create a set of bump on a tonal adjustment graph by providing a set of inputs on the tonal adjustment graph. FIG. 3 illustrates an example of creating a bump on a tonal adjustment graph through a GUI 300 at four different stages 305, 310, 315, and 320.

As shown in the first stage 305 of FIG. 3, the GUI 300 includes a display area 370, a tonal adjustment graph 340, a selectable UI item 345, and a drop-down menu 350. The display area 370 is for displaying an image being edited. In this example, the display area 370 is displaying an image 325, which is a picture of a red bicycle. The selectable UI item 345 is for initiating a color selection tool for selecting a custom color component for the tonal adjustment graph 340. The operation of selecting a custom color component will be explained in more details below in Section II. The drop-down menu 350 is for selecting a primary color component or a luminance component for the tonal adjustment graph 340. In this example, the user has selected the luminance component for the tonal adjustment graph 340. As such, the tonal adjustment graph 340 is defined along the luminance component of the color space in which the color values of the image 325 are defined.

As shown in FIG. 3, the tonal adjustment graph 340 is defined along two axes: a horizontal axis that represents different values along the luminance component of the color space, and a vertical axis that represents different adjustment values. The far left of the horizontal axis represents a minimum luminance value (i.e., a black color). The luminance values increase from the left to the right on the horizontal axis of the tonal adjustment graph 340, and the far right of the horizontal axis represents a maximum luminance value (i.e., a white color). As such, the darker colors are represented toward the left side of the graph and the brighter colors are represented toward the right side of the graph. The mid-point 355 of the vertical axis of the tonal adjustment graph 340 represents zero adjustment. The adjustment values increases with positive adjustment values from the mid-point 355 to the top of the vertical axis, and decreases with negative adjustment values from the mid-point 355 to the bottom of the vertical axis.

Different embodiments of the application allow the user to use different methods to create a basic bump on the tonal adjustment graph 340. In some embodiments, the application allows the user to create a basic bump by specifying a center location and a height of the basic bump. The second stage 310 illustrates the GUI 300 when a user has specified a center location of the basic bump on the tonal adjustment graph 340. In some embodiments, the application allows the user to specify a center location of a basic bump by selecting a baseline location on the tonal adjustment graph (e.g., a location on the horizontal axis of the tonal adjustment graph 340 that corresponds to a particular color value along the color component). The selection of a baseline location may be performed by placing a cursor at the baseline location and providing an input (e.g., an input from a cursor controlling device or a hot key) or by performing a gesture (e.g., placing, pointing, or tapping a finger) at the baseline location on a device having a touch or near touch sensitive screen. As shown in the second stage 310, the user has specified the center location for the basic bump by placing a cursor at location 330 on the horizontal axis of the tonal adjustment graph 340 and providing an input. The selection is also indicated by the highlighting of the horizontal axis of the tonal adjustment graph 340.

The third stage 315 illustrates the GUI 300 after the user has begun to specify a height for the basic bump. In some embodiments, the application allows the user to specify a height for the basic bump by providing a vector on the tonal adjustment graph. In these embodiments, the magnitude of the vector corresponds to the height of the basic bump (i.e., the larger the magnitude, the higher the basic bump). The vector can be provided by dragging a cursor in a direction on the tonal adjustment graph or by performing a gesture (e.g., dragging a finger) on a device having a touch or near touch sensitive screen that displays the tonal adjustment graph. As shown, the user has provided a vector on the tonal adjustment graph 340 by dragging the cursor upward, as indicated by the arrow 360. As a result of the drag movement, the application generates a basic bump 335 on the tonal adjustment graph 340. Specifically, the basic bump 335 has a center that corresponds to the selected baseline location 330 and a height that corresponds to the user provided vector.

Different embodiments of the application generate different types of basic bumps based on the user's input on the tonal adjustment graph. In this example, the basic bump 335 generated by the application is a Gaussian curve, which is a bell-shaped curve with two sides gradually fall off from an apex of the curve. A Gaussian curve is a symmetrical bell-shaped curve that is generated using a Gaussian function $$f(x) = ae^{\frac{(x-b)^2}{2c^2}},$$

whereas parameter "a" represents the height of the curve's peak (i.e., the highest point on the Gaussian curve), parameter "b" represents the position of the center of the peak, and parameter "c" controls the width of the "bell".

The application determines the center of the peak (i.e., parameter "b") based on the user's selected baseline location. The application also determines the height of the peak (i.e., parameter "a") based on the user's vector input. Different embodiments construct the Gaussian curves with different widths by using different values for the parameter "c" in the Gaussian function. For example, the application of some embodiments may use a larger "c" value (e.g., 0.8) to construct a Gaussian curve with a wide width and the application of other embodiments may use a smaller "c" value (e.g., 0.2) to construct a Gaussian curve with a narrow width.

As mentioned above, the curve on the tonal adjustment graph corresponds different color values within a tonal range to different adjustment values on the tonal adjustment graph. In this example, the bump 335 corresponds different luminance values on the tonal adjustment graph 340 to different adjustment values. As shown, the Gaussian curve 335 specifies that the luminance values that are represented at locations around the selected baseline location 330 (i.e., mid-tone luminance values) have a larger positive adjustments than the luminance values that are represented at locations that are farther away from the selected baseline location 330 (i.e., bright and dark color values). In some embodiments, the application adjusts the color values of the image 325 based on the bump. As shown, the color values of the image 325 (especially those having mid-tone luminance values) have increased in brightness.

The fourth stage 320 illustrates the GUI 300 after the user has moved the cursor further upward on the tonal adjustment graph 340, as indicated by the arrow 365. The cursor movement specifies a new height for the bump 335. As a result, the application adjusts the height of the bump 335 according to the new vector. The application also re-adjusts the color values of the image 325 based on the modified bump 335. As shown, the color values of the image 325 (especially those having mid-tone luminance values) in the fourth stage 320 is shown to be brighter than the color values of the image 325 in the third stage 315.

Figure 3A:
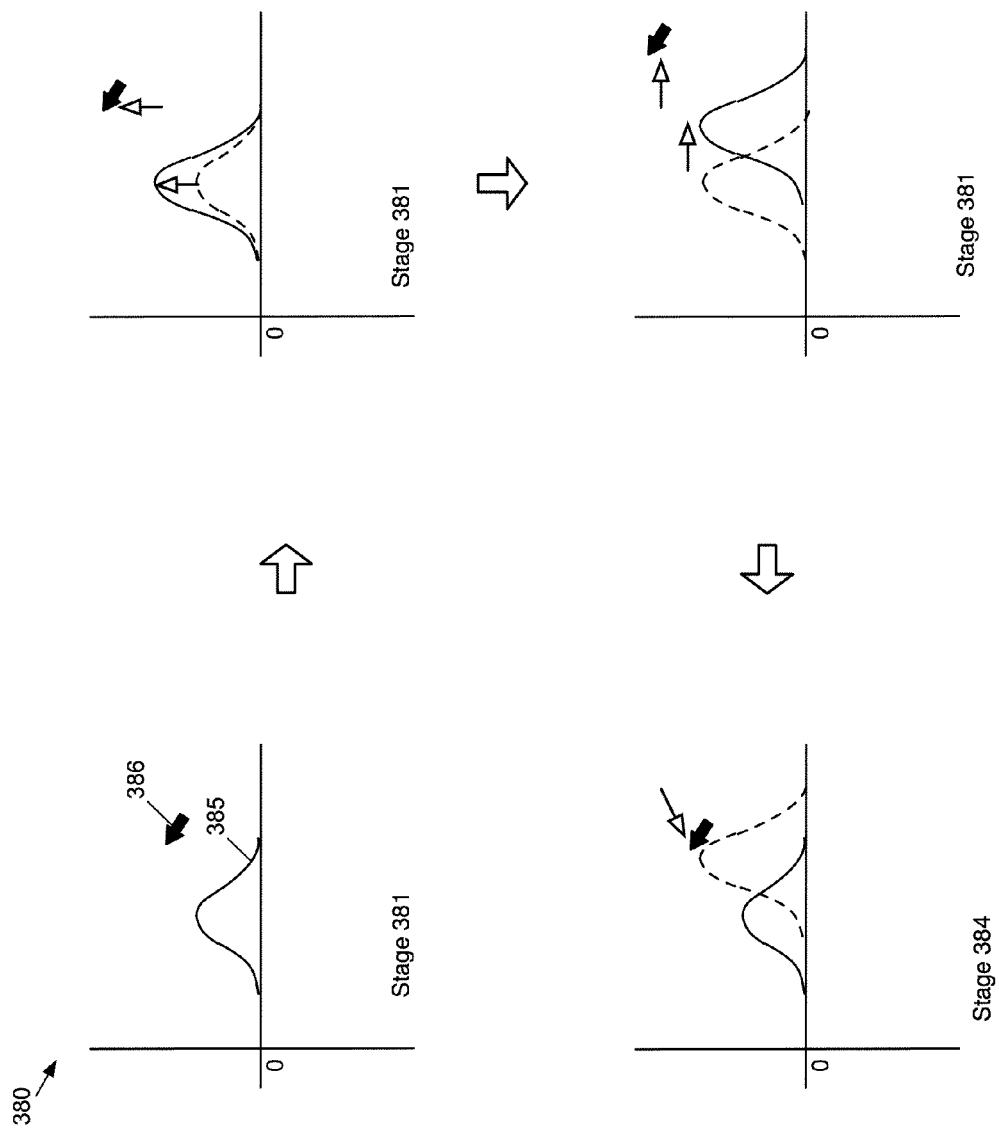
FIG. 3a illustrates an example of manipulating a bump on a tonal adjustment graph through a GUI.

Once a basic bump is created, the media editing application of some embodiments allows the user to manipulate the bump. FIG. 3a illustrates an example manipulation of a basic bump in four different stages 381-384. Specifically, this figures illustrates that the media editing application of some embodiments allows the user to change height of the basic bump or move the basic bump horizontally by providing a vector input vertically and/or horizontally. This figure illustrates a tonal adjustment graph 380 and a basic bump 385.

The first stage 381 illustrates the basic bump 385 that has been created. The user places a cursor 386 and selects a location (e.g., by clicking) on the tonal adjustment graph 380. The next stage 382 illustrates that the user has dragged the cursor 386 vertically upward in the tonal adjustment graph 380. The media editing application increases the height as the cursor 386 is moving upward. The dotted curve represents the shape of the basic bump 385 at the previous stage 381. The media editing application also adjust the color values an image (not shown) based on the modified bump 385.

The third stage 383 shows that the user has dragged the cursor 386 horizontally to the right and the media editing application has moved the basic bump 385 to the right along the horizontal axis. The dotted curve represents the position of the basic bump 385 at the previous stage 382. The media editing application also adjust the color values the image (not shown) based on the modified bump 385.

The fourth stage 384 illustrates that the user has provided both vertical and horizontal vectors by moving the cursor 386 diagonally (i.e., dragging the cursor diagonally) to the lower left. The media editing application therefore reduces the height of the basic bump 385 as the media editing application moves the basic bump 385 to the left. The media editing application also adjust the color values an image (not shown) based on the modified bump 385.

In the example illustrated above by reference to FIG. 3, the application generates a Gaussian curve based on the user's input on the tonal adjustment graph. In other embodiments, the application may generate different types of curve, such as a Bezier curve, which is an ellipsoid-shaped curve.

Figure 4:
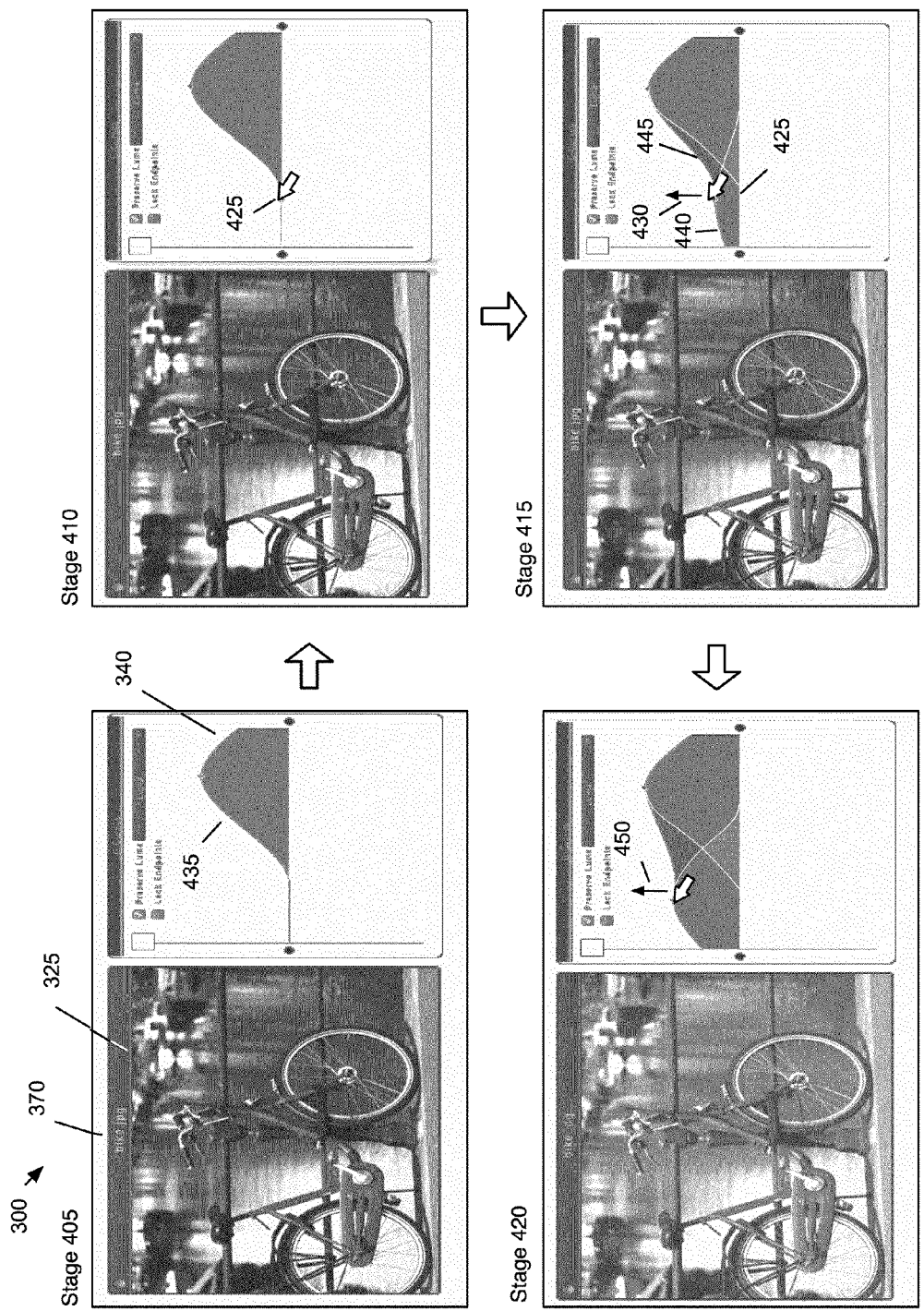
FIG. 4 illustrates an example of generating a composite bump by blending two basic bumps together.

As mentioned above, the application of some embodiments allows the user to create more than one basic bump on the tonal adjustment graph. In these embodiments, the application generates a composite bump (also referred as a blended bump) by blending the basic bumps together. FIG. 4 illustrates an example of generating a composite bump by blending two basic bumps together through the GUI 300 at four different stages 405, 410, 415, and 420.

The first stage 405 is similar to the fourth stage 320 of FIG. 3, except that the tonal adjustment graph 340 includes a different basic bump 435. As shown, the GUI 300 display the image 325 in the display area 370 and the tonal adjustment graph 340. The tonal adjustment graph 340 in this example has a tonal range that is defined along a luminance component. As such, the horizontal axis of the tonal adjustment graph 340 represents different luminance values of the color space in which the color values of the image 325 are defined. Since the bump 435 covers an area that is toward the higher end of the luminance spectrum (i.e., the center of the bump 435 is located on the right side of the horizontal axis of the tonal adjustment graph 340), only the pixels with high luminance values are adjusted to be brighter.

The second stage 410 illustrates the GUI 300 after the user has begun to create a second basic bump on the tonal adjustment graph 340. As shown, the user has selected a baseline location 425 on the horizontal axis of the tonal adjustment graph 340. The third stage 415 illustrates the GUI 300 after the user has provided a vector input on the tonal adjustment graph 340. As shown, the user has dragged the cursor toward the top of the tonal adjustment graph 340, as indicated by the arrow 430. Based on the user's inputs, the application creates a basic bump 440 on the tonal adjustment graph 340 with a center of the bump located at the selected baseline location 425 and a height that corresponds to the vector input. In addition, the application generates a composite bump 445 based on the basic bumps 435 and 440. Different embodiments of the application use different techniques to generate the composite bump. In this example, the composite bump 445 is generated by adding the two basic bumps 435 and 440. Specifically, for any given point on the horizontal axis, the composite bump 445 corresponds to an adjustment value that equals to the sum of the corresponding adjustment values from the two basic bumps 435 and 440. The application of some embodiments adjusts the color values of the image using this composite bump. Since the newly generated composite bump 445 includes the basic bump 440 in addition to the already existing basic bump 435, the color values of the image 325 with low luminance values are also adjusted to be brighter in this third stage 415.

The fourth stage 420 illustrates the GUI 300 after the user has increased the height of the basic bump 440. As shown, the user has dragged the cursor further upward, toward the top of the tonal adjustment graph 340, as indicated by the arrow 450. As a result, the application modifies the basic bump 440 as well as the composite bump 445 to reflect this change. As a result, the color values of the image 325 with low luminance values are adjusted to be even brighter at the fourth stage 420 than the color values in the third stage 415.

Figure 5:
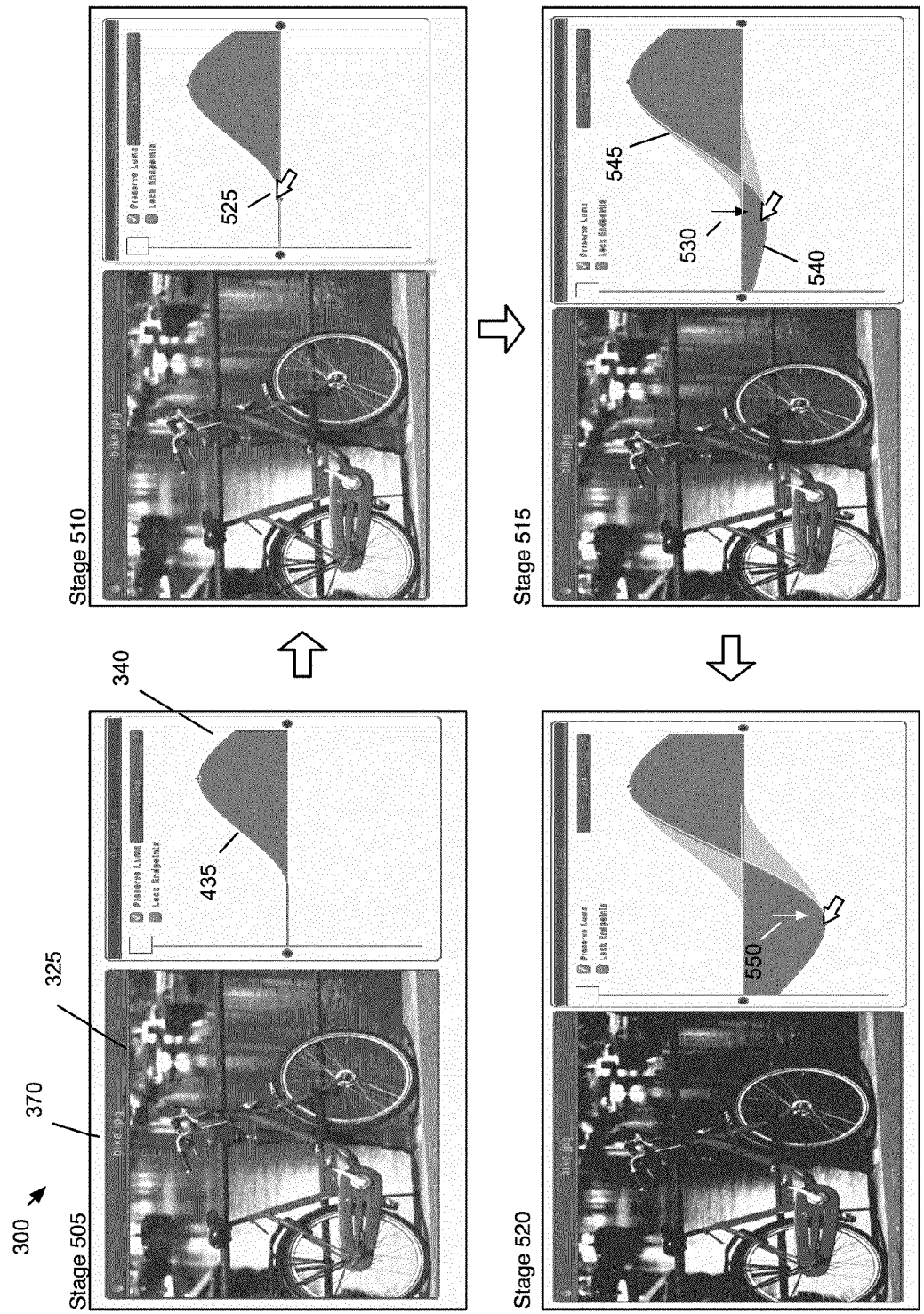
FIG. 5 illustrates another example of generating a composite bump.

FIG. 4 illustrates an example of generating a composite bump based on two basic bumps that are both on the positive side of the tonal adjustment graph (i.e., above the horizontal axis of the tonal adjustment graph). FIG. 5 illustrates another example of generating a composite bump through the GUI 300 at four different stages 505, 510, 515, and 520. In the example illustrated in FIG. 5, the composite bump is generated based on a basic bump that is on the positive side of the tonal adjustment graph and a basic bump that is on the negative side of the tonal adjustment graph.

The first stage 505 is identical to the first stage 405 of FIG. 4. As shown, the GUI 300 displays the image 325 in the display area 370 and the tonal adjustment graph 340. The tonal adjustment graph 340 in this example has a tonal range that is defined along the luminance component. As such, the horizontal axis of the tonal adjustment graph 340 represents different luminance values of the color space in which the color values of the image 325 are defined. Since the bump 435 covers an area that is toward the higher end of the luminance spectrum (i.e., the center of the bump 435 is located on the right side of the horizontal axis of the tonal adjustment graph 340), only the color values with high luminance values are adjusted to be brighter.

The second stage 510 illustrates the GUI 300 after the user has begun to create a second basic bump on the tonal adjustment graph 340. As shown, the user has selected a baseline location 525 on the horizontal axis of the tonal adjustment graph 340. The third stage 515 illustrates the GUI 300 after the user has provided a vector input on the tonal adjustment graph 340. Unlike the example illustrated in FIG. 4, the user in the third stage 515 provides a vector by moving (or dragging) a cursor downwards, toward the bottom of the tonal adjustment graph 340, as indicated by the arrow 530. Based on the user's inputs, the application creates a basic bump 540 on the tonal adjustment graph 340 with a center of the bump located at the selected baseline location 525 and a height that corresponds to the vector input.

As shown, since the user creates a vector in a downward direction, the basic bump 540 is on the negative side of the tonal adjustment graph 340 (i.e., the bump 540 is located below the horizontal axis of the tonal adjustment graph 340). In addition, the third stage 515 also illustrates that the application generates a composite bump 545 based on the basic bumps 435 and 540. Different embodiments of the application use different techniques to generate the composite bump. In this example, the composite bump 545 is generated by adding the two basic bumps 435 and 540. Specifically, for any given point on the horizontal axis, the composite bump 545 corresponds to an adjustment value that equals to the sum of the corresponding adjustment values from the two basic bumps 435 and 540. The application of some embodiments adjusts the color values of the image using this composite bump. Since the newly generated composite bump 545 includes the basic bump 540, the color values of the image 325 with low luminance values are adjusted to be darker in this third stage 515.

The fourth stage 520 illustrates the GUI 300 after the user has increased the height of the basic bump 540. As shown, the user has dragged the cursor further downward, toward the bottom of the tonal adjustment graph 340, as indicated by the arrow 550. As a result, the application modifies the basic bump 540 as well as the composite bump 545 to reflect this change. As a result, the color values of the image 325 with low luminance values are adjusted to be even darker at the fourth stage 520 than the color values in the third stage 515.

Figure 6:
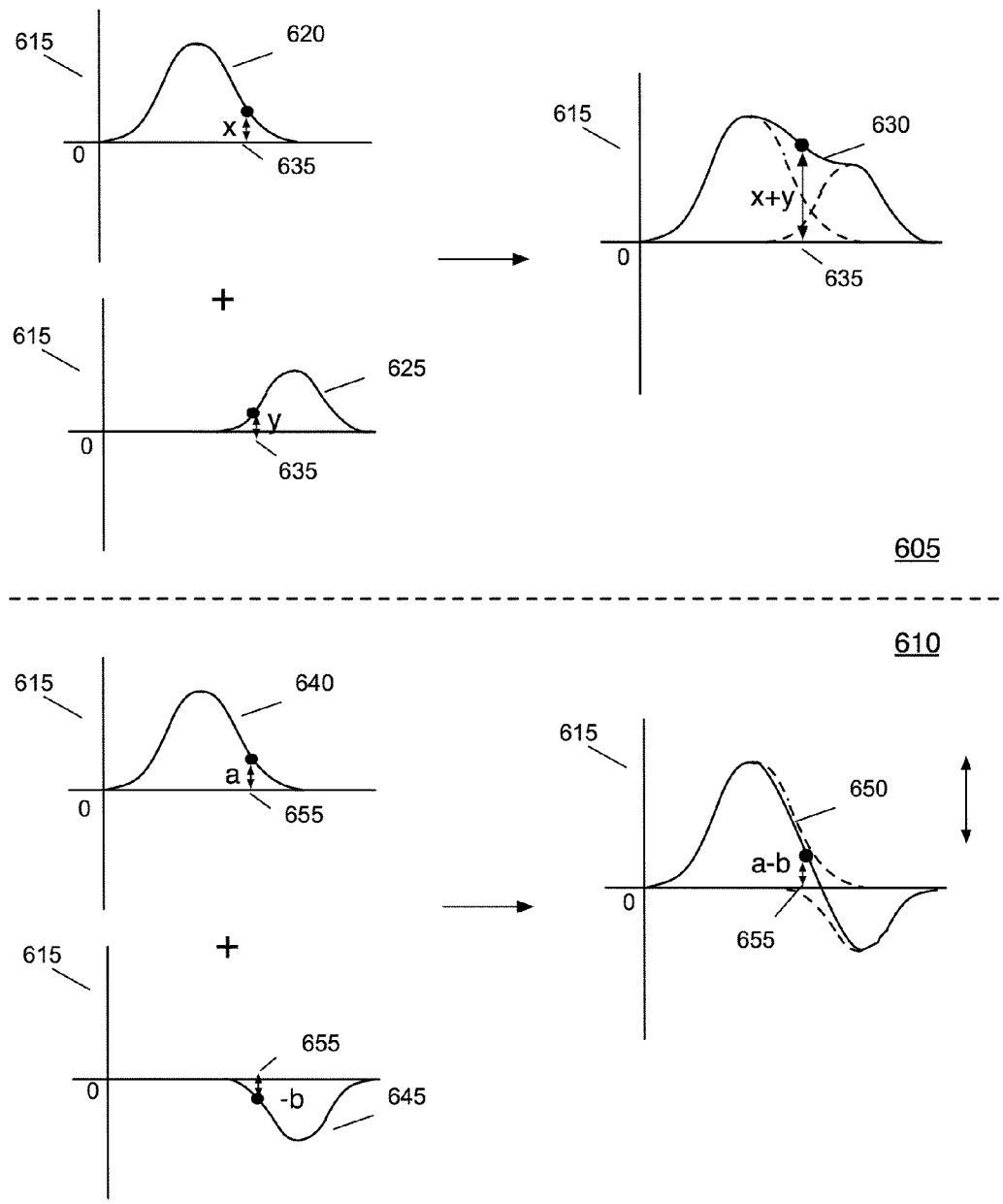
FIG. 6 illustrates the mechanism of adding different bumps together.

FIGS. 4 and 5 above illustrate two examples of generating a composite bump by blending two different bumps together. In those two examples, the application blends the different bumps by adding the bumps together. FIG. 6 illustrates the mechanism of adding different bumps together through two examples 605 and 610. In example 605, two basic bumps 620 and 625 have been created on a tonal adjustment graph 615. As shown, both basic bumps 620 and 625 are on the positive side of the tonal adjustment graph 615 as both bumps 620 and 625 are located above the horizontal axis of the tonal adjustment graph 615. Each basic bump corresponds different color values represented by different horizontal locations of the tonal adjustment graph 615 to different adjustment values. For example, the basic bump 620 corresponds the color value represented by the horizontal location 635 to a value "x" while the basic bump 625 corresponds the same color value represented by the horizontal location 635 to a value "y". The example 605 also shows a composite bump 630 that is generated by the application of some embodiments based on the basic bumps 620 and 625. As shown, the composite bump 630 is generated by adding the two basic bumps 620 and 625 together. Thus, the generated composite bump 630 corresponds each color value represented by a horizontal location of the tonal adjustment graph 615 to an adjustment value that equals to a sum of the color value's corresponding adjustment values from the two basic bumps 620 and 625. For example, the generated composite bump 630 corresponds the color value represented by the horizontal location 635 to a value equals to a sum of "x" and "y" (i.e., x+y).

Example 610 illustrates another composite bump. In this example, two basic bumps 640 and 645 have been created on the tonal adjustment graph 615. As shown, the basic bump 640 is on the positive side of the tonal adjustment graph 615 (i.e., above the horizontal axis of the tonal adjustment graph 640) while the basic bump 645 is on the negative side of the tonal adjustment graph 615 (i.e., below the horizontal axis of the tonal adjustment graph 640). Each basic bump corresponds different color values represented by different horizontal location of the tonal adjustment graph 615 to different adjustment values. For example, the basic bump 640 corresponds the color value represented by the horizontal location 655 to a value "a" while the basic bump 645 corresponds the same color value represented by the horizontal location 655 to a value "−b".

The example 610 also shows a composite bump 650 that is generated by the application of some embodiments based on the basic bumps 640 and 645. As shown, the composite bump 650 is generated by adding the two basic bumps 640 and 645.

Thus, the generated composite bump 650 corresponds each color value represented by a horizontal location of the tonal adjustment graph to an adjustment value that equals to a sum of the color value's corresponding adjustment values from the two basic bumps 640 and 645. For example, the generated composite bump 650 corresponds the color value represented by the horizontal location 655 to a value equals to a sum of "a" and "−b" (i.e., a−b).

The application of some embodiments may employ a function to blend two or more basic bumps. For instance, the application may use a function $$B(t) = \sum_{i=1}^{n} f\left(1 - \frac{t - bc_i}{bw_i}\right) bh_i,$$

whereas B(t) is the composite bump from blending n bumps, t is a horizontal location of the tonal adjustment graph, bc is the baseline location of each basic bump, bw is the width of each basic bump, and bh is the height of each basic bump. That is, the composite bump's adjustment value for a particular horizontal location of the tonal adjustment graph is a sum of adjustment values of the basic bumps that are weighted for the particular horizontal location by a weighting function.

Different embodiments use different weighting functions. For instance, the application of some embodiments may use a Gaussian function, a smoothing function, or a liner function, etc. More specifically, the application of some embodiments may use a function, $$f(x) = 6x^5 - 15x^4 + 10x^3$$

or a function, $$f(x) = x^2 * (3 - 2x),$$

whereas in each of these two functions, x is $$1 - \frac{t - bc_i}{bw_i}.$$

Moreover, the application of some embodiments employs a simple cubic Hermite interpolation technique or Perlin's smooth step to compute adjustment values when the adjustment values and horizontal location are of floating type. That is, when the resulting adjustment values of the composite bump do not have sufficient granularity, the application of these embodiments interpolates to generate intermediate adjustment values that have sufficient granularity.

Figure 7:
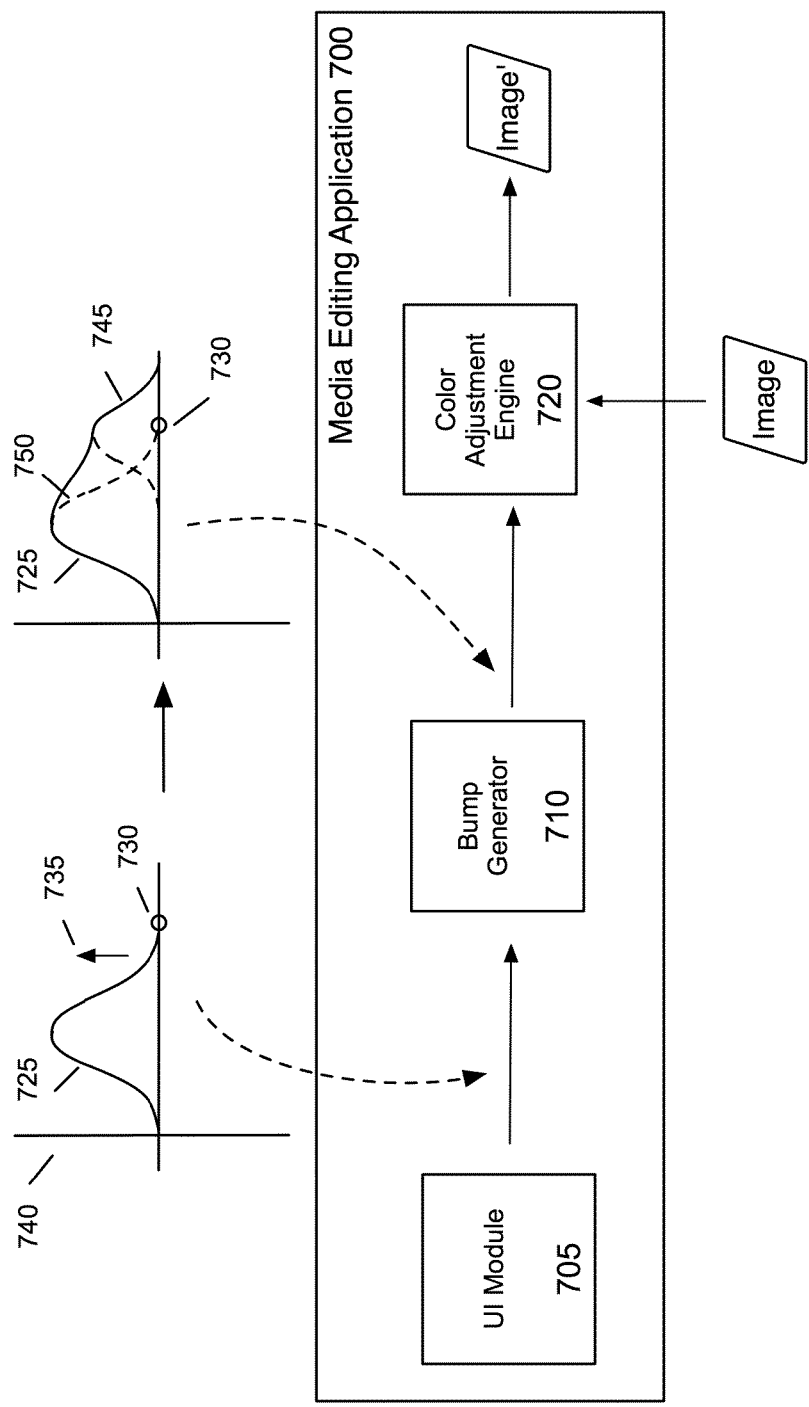
FIG. 7 illustrates a media editing application of some embodiments that allows a user to edit the color values of an image by creating a set of basic bumps on a tonal adjustment graph.

FIG. 7 illustrates a media editing application 700 of some embodiments that allows a user to edit the color values of an image by creating a set of basic bumps on a tonal adjustment graph. As shown in FIG. 7, the media editing application 700 includes a UI module 705, a bump generator 710, and a color adjustment engine 720. The UI module 705 receives user inputs provided on a tonal adjustment graph. In some embodiments, the user inputs include providing a selection of a baseline location on the tonal adjustment graph and providing a vector.

FIG. 7 illustrates a set of example user inputs on a tonal adjustment graph 740. In this example, the user inputs include selecting a baseline location 730 (i.e., a location on the horizontal axis of the tonal adjustment graph 740) and providing a vector 735. After receiving the user inputs on the tonal adjustment graph, the UI module 705 passes the inputs to the bump generator 710.

Based on the received user inputs, the bump generator 710 creates a basic bump on the tonal adjustment graph 740. In this example, the bump generator 710 creates a basic bump 745 on the tonal adjustment graph 740 based on the baseline location 730 and the vector 735. In some embodiments, when there exists another bump on the tonal adjustment graph, the media editing application 700 generates a composite bump based on the basic bumps. Since another basic bump 725 has already been created on the tonal adjustment graph 740 in FIG. 7, the bump generator 710 generates a composite bump 750 by blending the basic bumps 725 and 745.

The bump generator 710 then passes the composite bump 750 to the color adjustment engine 720. The color adjustment engine 720 receives an image and adjusts the color values of the image based on the composite bump 750 on the tonal adjustment graph 740.

When adjusting the color values of the image, the application of some embodiments iteratively performs the following procedure for each pixel in the image. First, the application retrieves, from the pixel, a color value of the particular color component along which the tonal adjustment graph is defined. The application then identifies a corresponding adjustment value for the retrieved color value on the tonal adjustment graph, and uses the adjustment value to adjust the color values of the pixel.

Figure 8:
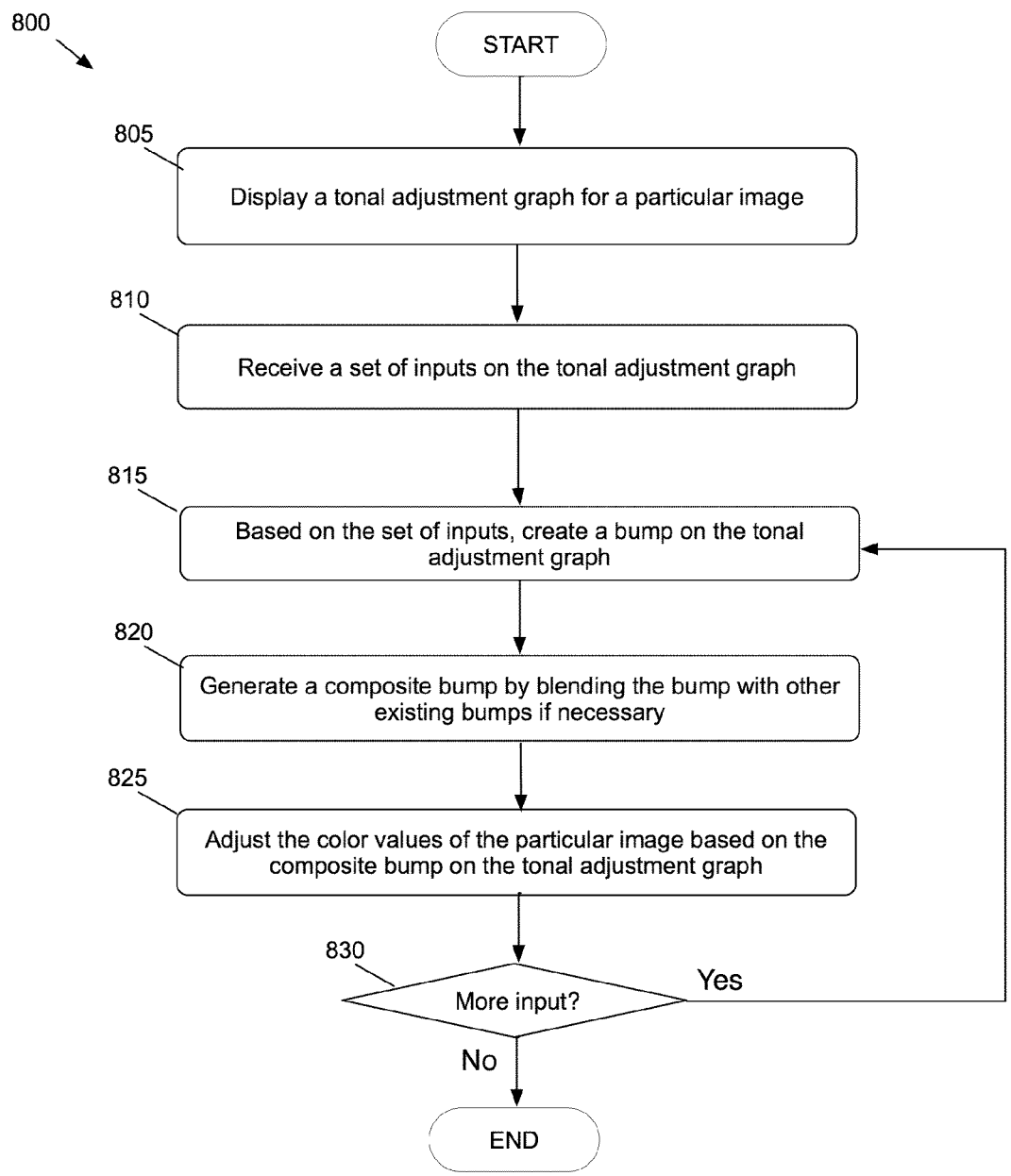
FIG. 8 conceptually illustrates a process for generating a composite bump on a tonal adjustment graph and editing an image based on the composite bump.

FIG. 8 conceptually illustrates a process 800 for generating a composite bump on a tonal adjustment graph and editing an image based on the composite bump. In some embodiments, the process is performed by the media editing application 700 of FIG. 7. The process 800 begins by displaying (at 805) a tonal adjustment graph for a particular image.

Next, the process receives (at 810) a set of inputs on the tonal adjustment graph. In some embodiments, the set of inputs includes selection of a baseline location on the tonal adjustment graph and definition of a vector. The process then (at 815) creates a basic bump on the tonal adjustment graph based on the received set of inputs. In some embodiments, the application uses the selected baseline location as the center location of the basic bump. The application of some embodiments also uses the vector input to specify a height of the basic bump. As mentioned above, the basic bump corresponds different color values within a tonal range to different adjustment values on the tonal adjustment graph.

After creating a basic bump based on the user inputs, the process generates (at 820) a composite bump on the tonal adjustment graph by blending the basic bump with any existing bumps if necessary. In some embodiments, when there exists one or more other bumps on the tonal adjustment graph, the process generates a composite bump by blending the newly created basic bump with the existing bumps. Different embodiments blend bumps differently as described above. If there does not exist any other bump, the newly created bump is the composite bump for the tonal adjustment graph.

Next, the process adjusts (at 825) the particular image based on the composite bump on the tonal adjustment graph. The operation of adjusting an image based on a composite bump on a tonal adjustment graph will be described in more detail below by reference to FIG. 10.

The process then determines (at 830) whether there is any more input received on the tonal adjustment graph. If more inputs are received, the process returns to 815 to create a new basic bump based on the newly received inputs. The process will cycle through operations 815-830 until no more inputs are received on the tonal adjustment graph. If there is no more inputs received, the process ends.

Figure 9:
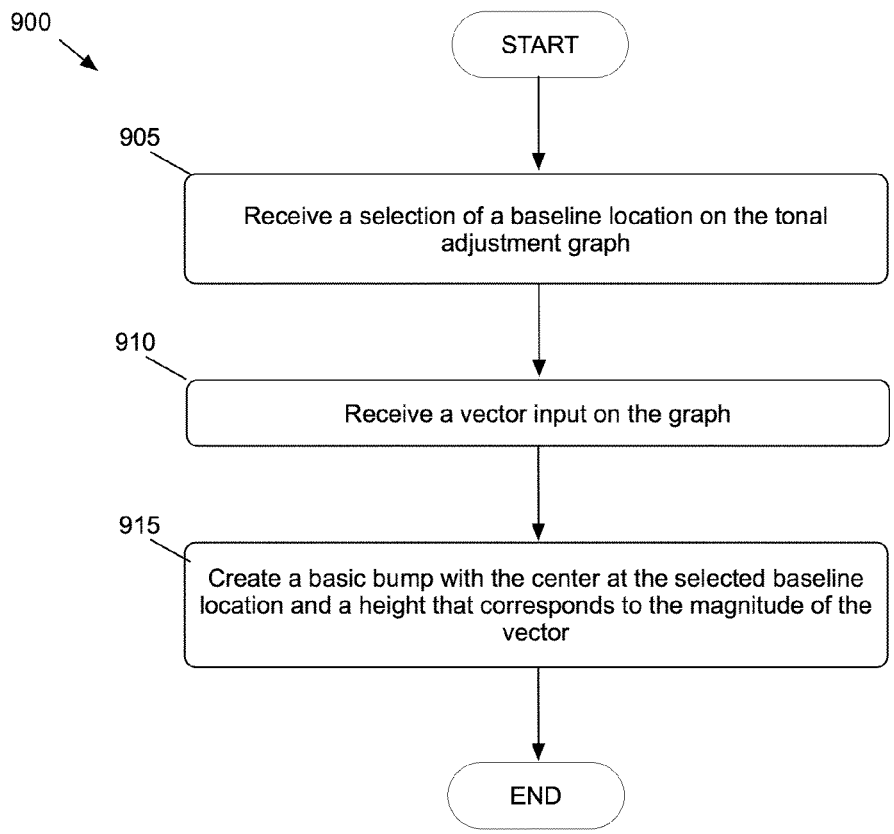
FIG. 9 conceptually illustrates a process for creating a basic bump based on a set of user inputs on a tonal adjustment graph for editing an image.

FIG. 9 conceptually illustrates a process 900 for creating a basic bump based on a set of user inputs on a tonal adjustment graph for editing an image. In some embodiments, the process is performed by the bump generator 710 of the media editing application 700. The process 900 begins by receiving (at 905) a selection of a baseline location on a tonal adjustment graph. As mentioned above, the baseline location is a location on an axis of the tonal adjustment graph that represents different values along a color component of a color space. The process then receives (at 910) a vector input on the tonal adjustment graph. In some embodiments, the user can provide the vector input by dragging a cursor on the tonal adjustment graph or by performing a gesture (e.g., placing, pointing, or tapping a finger) on a device having a touch or near touch sensitive screen that displays the tonal adjustment graph.

After receiving both inputs, the process (at 915) creates a basic bump on the tonal adjustment graph with a center of the bump at the selected baseline location and a height that corresponds to the magnitude of the received vector. In some embodiments, the larger vector's magnitude corresponds to a larger height on the bump. Then the process ends.

Figure 10:
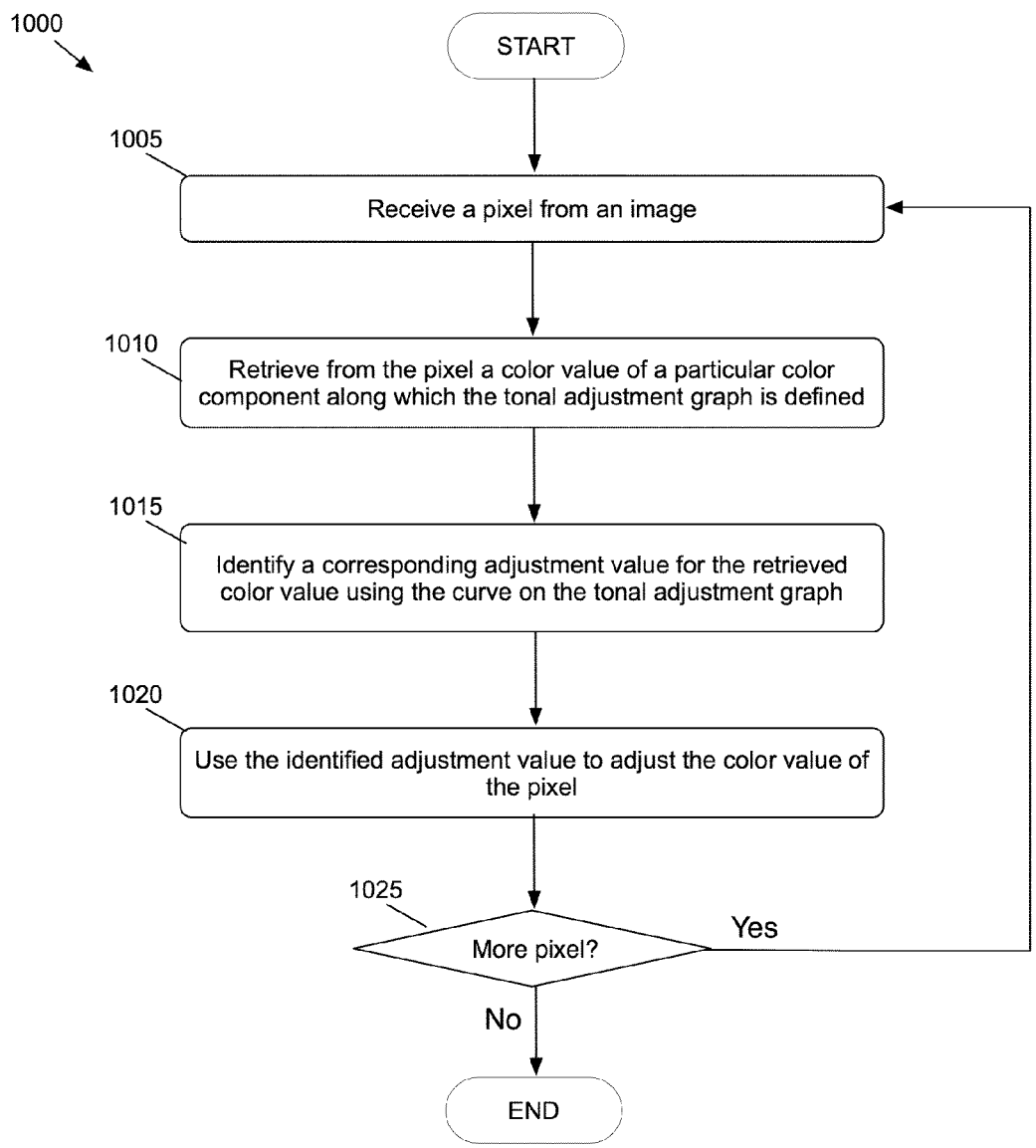
FIG. 10 conceptually illustrates a process for adjusting the color values of an image based on a composite bump on a tonal adjustment graph.

FIG. 10 conceptually illustrates a process 1000 for adjusting the color values of an image based on a composite bump on a tonal adjustment graph. In some embodiments, the process 1000 is performed by the color adjustment engine 720 of the media editing application 700 during operation 825 of process 800 of FIG. 8. In addition, the application performs the process 1000 iteratively for each pixel in the image until all pixels in the image have been traversed and processed. As shown, the process begins by receiving (at 1005) a pixel from the image.

The process next retrieves (at 1010), from the pixel, a color value of the particular color component. As mentioned above, the tonal range of the tonal adjustment graph of some embodiments can be defined along one of the primary color components of a color space in which the color values of an image are defined, or along a luminance component. In these embodiments, the bump on the tonal adjustment graph corresponds each color value along a particular color component to a corresponding adjustment value. For example, if the tonal range of the tonal adjustment graph is defined along a red color component, the process retrieves a red color value from the pixel. The process then identifies (at 1015) a corresponding adjustment value for the retrieved color value using the composite bump on the tonal adjustment graph.

After identifying the corresponding adjustment value for the pixel, the process uses (at 1020) the identified adjustment value to adjust the retrieved color value of the pixel. In some embodiments, the application adjusts the color value by performing a computation using the retrieved color value and the adjustment value (e.g., multiplying the color value by the adjustment value, adding the adjustment value to the color value, using a function that takes as inputs the color value and the adjustment value and outputs the adjusted color value, etc.)

The process then determines whether there are any pixels in the image that have not been processed. If more pixels in the image need to be processed, the process returns to 1005 to receive another pixel from the image. The process will cycle through operations 1005-1025 until all the pixels in the image are processed. If all the pixels from the image are processed, the process ends.

Figure 11:
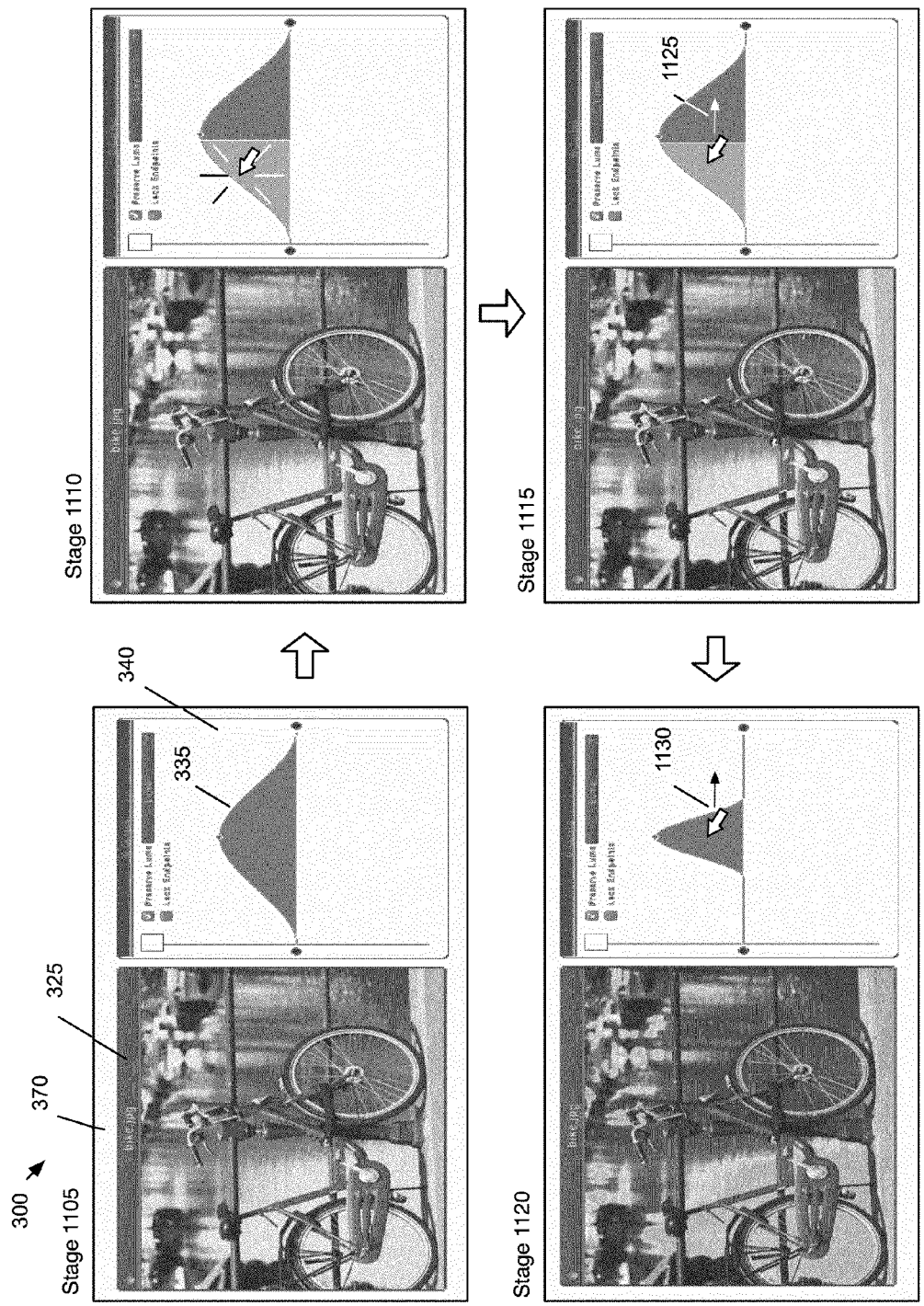
FIG. 11 illustrates an example operation of modifying the width of a basic bump.

After a bump (a basic bump or a composite bump) is created on the tonal adjustment graph, the application of some embodiments allows the user to modify several attributes of the bump. For example, the application of some embodiments allows a user to select an individual basic bump and adjust the width of the basic bump. FIG. 11 illustrates an example operation of modifying the width of a basic bump through GUI 300 at four different stages 1105, 1110, 1115, and 1120.

The first stage 1105 is identical as the fourth stage 320 of FIG. 3. As shown, the GUI 300 displays the image 325 in the display area 370 and the tonal adjustment graph 340. The tonal adjustment graph 340 also includes a basic bump 335 that was created by a user for adjusting the color values of the image 325.

The second stage 1110 illustrates the GUI 300 after the user has initiated a width adjustment operation on the bump 335 by selecting the bump 335. In some embodiments, the user may modify the width of a basic bump on the tonal adjustment graph by selecting the basic bump and providing a vector input. The selection of a bump can be performed by placing a cursor at an area inside the bump and providing an input (e.g., an input from a cursor controlling device or a hot key) or by performing a gesture (e.g., placing, pointing, or tapping a finger) on a device having a touch or near touch sensitive screen that displays the bump 335. As shown, the user has selected the bump 335 by placing a cursor within the area covered by the bump 335 (i.e., the area between the bump 335 and the horizontal axis of the tonal adjustment graph) and providing a providing an input, as indicated by the highlighting of half of the area covered by the bump 335.

The third stage 1115 illustrates the GUI 300 after the user has begun to reduce the width of the bump 335. In some embodiments, the user may adjust the width of a bump by dragging a cursor either toward the center of the bump or away from the center of the bump. As shown, the user has dragged the cursor toward the center of the bump 335, as indicated by the arrow 1125. As a result of the drag movement, the width of the bump 335 has been reduced. In some embodiments, the application re-adjusts the color values of the image when the bump on the tonal adjustment graph is modified. As a result of the modification to the bump 335, a smaller range of color values along the luminance component is adjusted. As shown, the area of the image 325 that has been adjusted has shrunk in the third stage 1115 compare to the image in the second stage 1110.

In this example, the user has dragged the cursor toward the center of the bump 335 in order to reduce the width of the bump 335. The fourth stage 1120 illustrates the GUI 300 after the user has further reduced the width of the bump. As shown, the user has dragged the cursor further toward the center of the bump 335, as indicated by the arrow 1130. As a result, the width of the bump 335 in the fourth stage 1120 has been further reduced compare to the width of the bump in the third stage 1115. In addition, due to the modification to the bump 335, the area in the image that has been adjusted is also reduced. In a similar manner, the user may also drag the cursor away from the center of the bump to enlarge the width of the bump 324.

Figure 12:
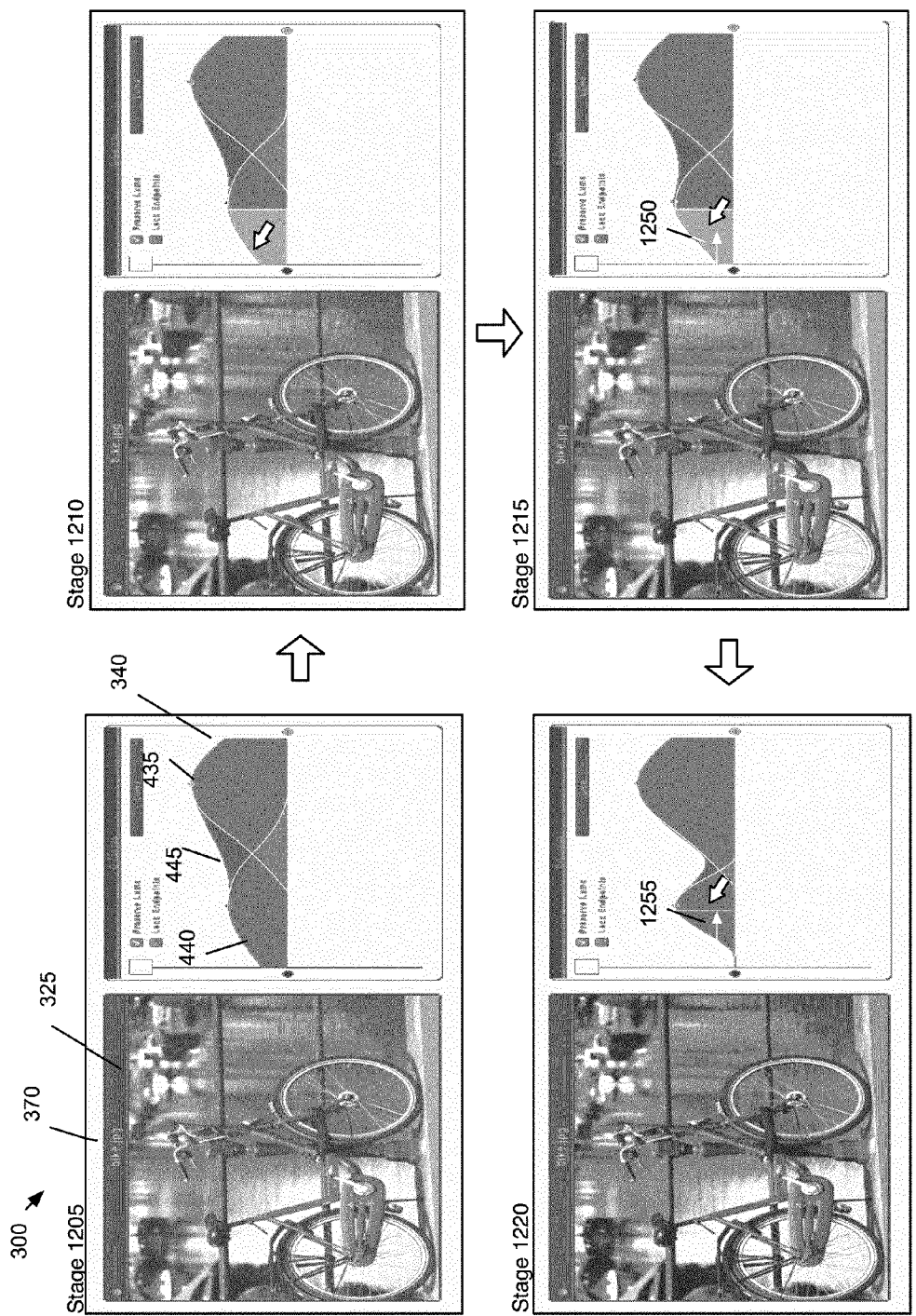
FIG. 12 illustrates another example of modifying the width of one of the basic bumps of a composite bump on a tonal adjustment graph.

FIG. 11 illustrates an example of reducing the width of a basic bump on a tonal adjustment graph when there is only one basic bump on the graph. FIG. 12 illustrates another example of modifying the width of one of the basic bumps of a composite bump on a tonal adjustment graph through the GUI 300 at four different stages 1205, 1210, 1215, and 1220.

The first stage 1205 is identical as the fourth stage 420 of FIG. 4. As shown, the GUI 300 displays the image 325 in the display area 370 and the tonal adjustment graph 340. The tonal adjustment graph 340 includes two basic bumps 435 and 440 that are created by a user for adjusting the color values of the image 325. The tonal adjustment graph 340 also includes a composite bump 445 that is generated based on the basic bumps 435 and 440.

The second stage 1210 illustrates the GUI 300 after the user has initiated a width adjustment operation on the bump 440 by selecting the bump 440. In some embodiments, the user may modify the width of one of the basic bumps of a composite bump on the tonal adjustment graph by selecting the basic bump and providing a vector input. The selection of a bump can be performed by placing a cursor at an area inside the bump and providing an input (e.g., an input from a cursor controlling device or a hot key) or by performing a gesture (e.g., placing, pointing, or tapping a finger) on a device having a touch or near touch sensitive screen that displays the bump 440. As shown, the user has selected the bump 440 by placing a cursor within the area covered by the bump 440 (i.e., the area between the bump 440 and the horizontal axis of the tonal adjustment graph) and providing a providing an input, as indicated by the highlighting of half of the area covered by the bump 440. As a result, the blended The third stage 1215 illustrates the GUI 300 after the user has begun to reduce the width of the bump 440. In some embodiments, the user may adjust the width of a bump by dragging a cursor either toward the center of the bump or away from the center of the bump. As shown, the user has dragged the cursor toward the center of the bump 440, as indicated by the arrow 1250. As a result of the drag movement, the width of the bump 440 has been reduced. In some embodiments, the application re-adjusts the color values of the image when the bump on the tonal adjustment graph is modified. As a result of the modification to the bump 440, a smaller range of dark color values (with low luminance values) along the luminance component is adjusted. As shown, the area of the image 325 that has been adjusted has shrunk in the third stage 1215 compare to the image in the second stage 1210. As a result, the blended bump 445 has been changed. That is, the horizontal range shared by the basic bumps 435 and 440 has been shrunk and the adjustment values represented by the blended bump for the range have been changed accordingly.

The fourth stage 1220 illustrates the GUI 300 after the user has further reduced the width of the bump. As shown, the user has dragged the cursor further toward the center of the bump 440, as indicated by the arrow 1255. As a result, the width of the bump 440 in the fourth stage 1220 has been further reduced compare to the width of the bump in the third stage 1215. In addition, due to the modification to the bump 440, the area in the image that has been adjusted is also reduced.

Figure 13:
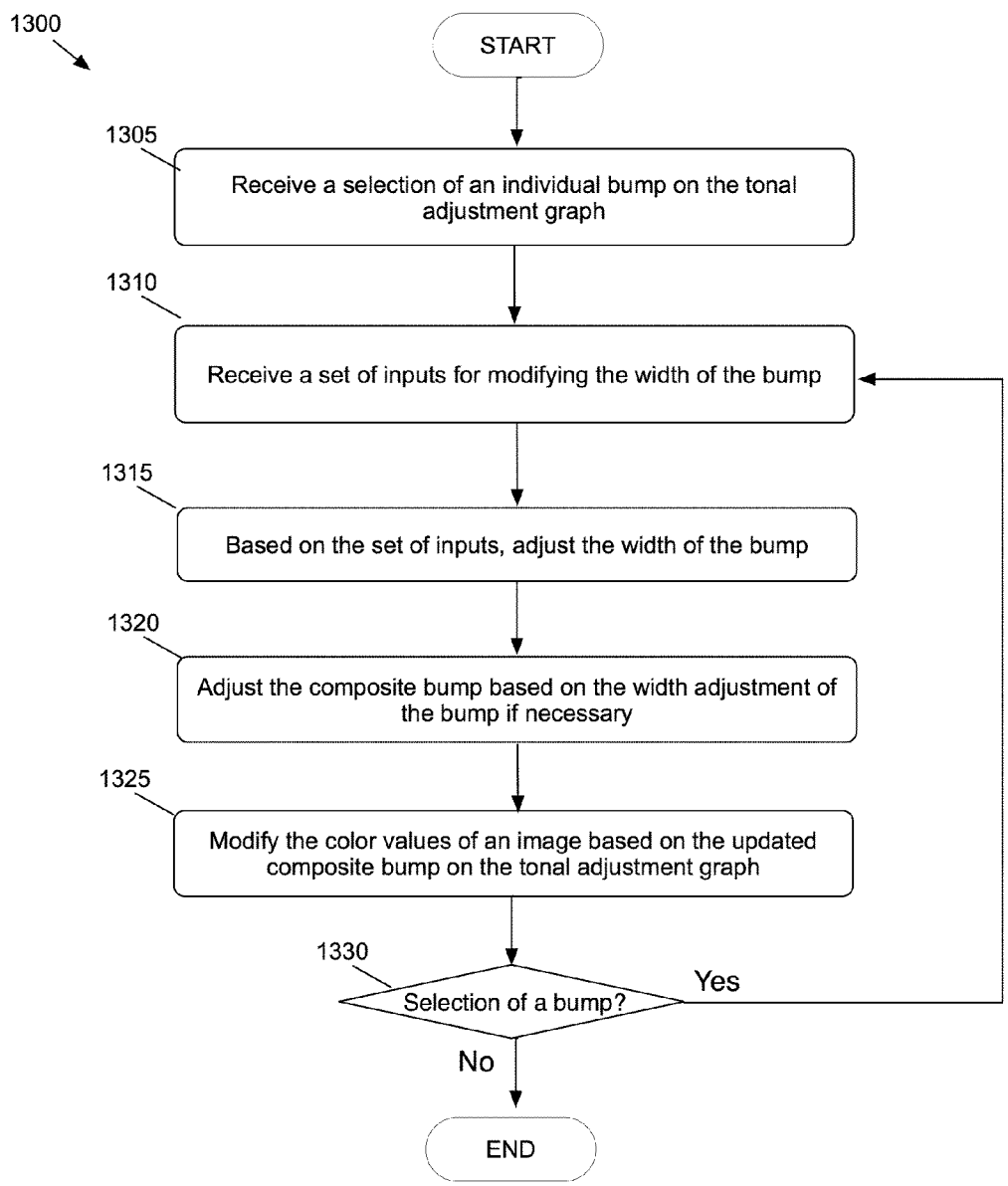
FIG. 13 conceptually illustrates a process for adjusting the width of a basic bump based on a set of user inputs.

FIG. 13 conceptually illustrates a process 1300 for adjusting the width of a basic bump based on a set of user inputs. In some embodiments, the process is performed by the media editing application 700 of FIG. 7. The process 1300 begins by receiving (at 1305) a selection of a basic bump on the tonal adjustment graph. As mentioned, the selection of a basic bump can be performed by placing a cursor at an area inside the bump and providing an input (e.g., an input from a cursor controlling device or a hot key) or by performing a gesture (e.g., placing, pointing, or tapping a finger) on a device having a touch or near touch sensitive screen that displays the bump.

Next, the process receives (at 1310) a set of inputs on the tonal adjustment graph for adjusting the width of the selected bump. In some embodiments, the user may adjust the width of a bump by dragging a cursor either toward the center of the bump or away from the center of the bump.

The process then (at 1315) adjusts the width of the selected bump based on the set of inputs. In some embodiments, dragging the cursor toward the center of the bump reduces the width of the bump and dragging the cursor away from the center of the bump enlarges the width of the bump. In addition, the extent of adjustment to the bump's width corresponds to the extent of the user's drag movement.

After adjusting the width of the basic bump, the process then modifies (at 1320) the composite bump based on the adjusted bump and other existing bumps. In some embodiments, the process modifies a horizontal range of the composite bump that the adjusted width of the basic bump spans. That is, the adjustment values within the range of the composite bump are modified because the adjustment values of the basic bump are modified as the width of the basic bump is adjusted.

Next, the process re-adjusts (at 1325) the color values of the image based on the updated composite bump on the tonal adjustment graph. The process then determines (at 1330) whether a basic bump is being selected. If another basic bump is selected, the process returns to 1310 to receive another set of inputs for modifying the width of the selected bump. The process will cycle through operations 1310-1330 until no more basic bump is selected. If no more bump is selected, the process ends.

Figure 14:
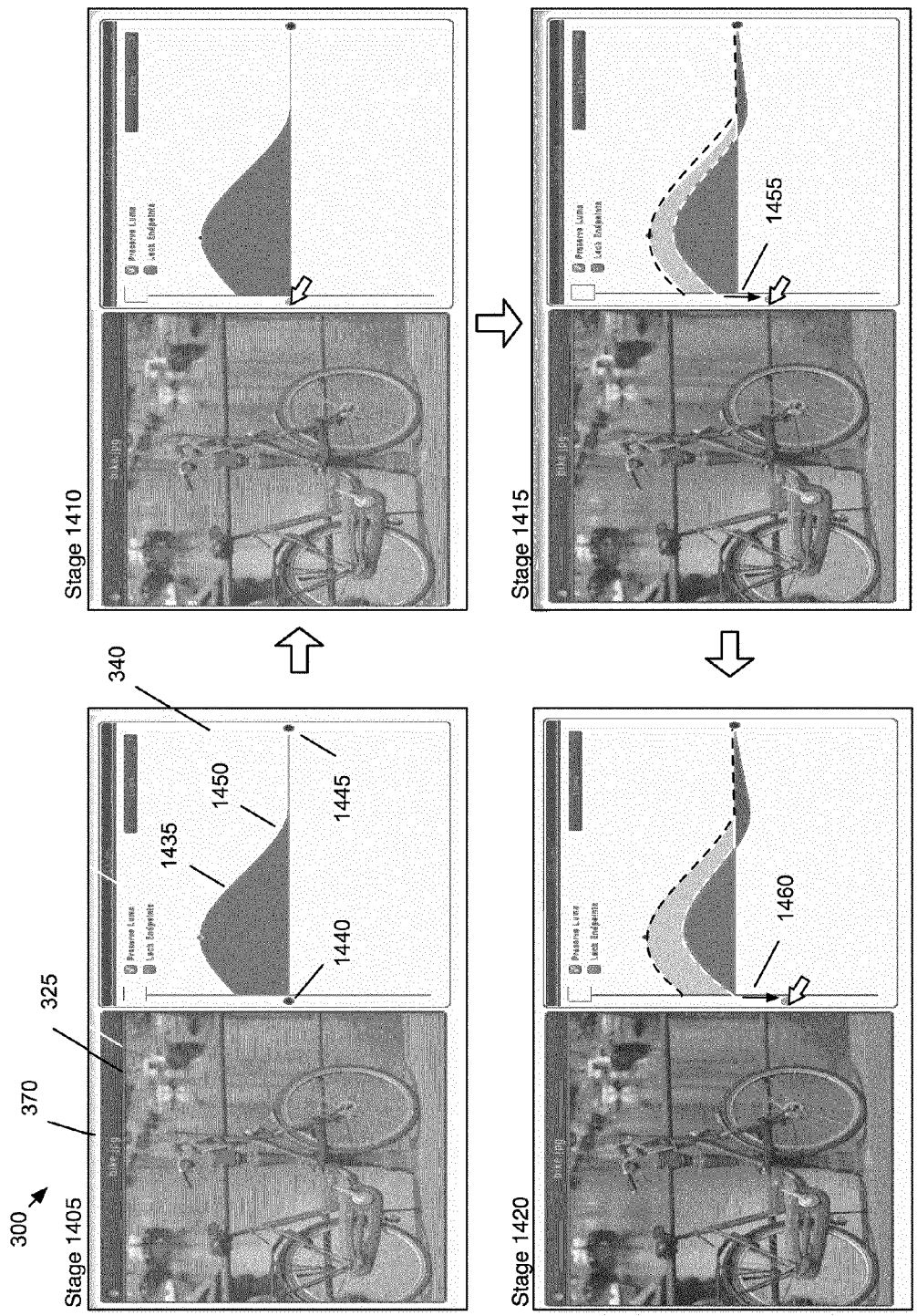
FIG. 14 illustrates an example of adjusting a composite bump by manipulating a horizontal endpoint of a tonal adjustment graph.

FIGS. 11 and 12 illustrate two examples of adjusting the width of a basic bump on a tonal adjustment graph. In addition to adjusting the characteristics of a basic bump, the application of some embodiments also allows the user to adjust the entire composite bump. Different embodiments of the application provide different tools for adjusting the entire composite bump. In one approach, the application allows the user to adjust the entire composite bump by selecting and modifying one of the horizontal endpoints of the tonal adjustment graph. FIG. 14 illustrates an example of this approach. Specifically, FIG. 14 illustrates an example of adjusting a composite bump by manipulating a horizontal endpoint of a tonal adjustment graph through the GUI 300 at four different stages 1405, 1410, 1415, and 1420.

The first stage 1405 is similar to the fourth stage 320 of FIG. 3, except that the tonal adjustment graph 340 includes a different basic bump 1435 that is created by a user. As shown, the GUI 300 displays the image 325 in the display area 370 and the tonal adjustment graph 340. Since the tonal adjustment graph 340 in this example only includes one basic bump 1435, the composite bump 1450 includes the basic bump 1435 and the flat line that extends toward the right side of the graph 340 from the basic bump 1435.

The tonal adjustment graph 340 in this example has a tonal range that is defined along a luminance component. As such, the horizontal axis of the tonal adjustment graph 340 represents different luminance values of the color space in which the color values of the image 325 are defined. Since the bump 1435 covers an area that is toward the lower end of the luminance spectrum (i.e., the center of the bump 1435 is located on the left side of the horizontal axis of the tonal adjustment graph 340), only the color values with low luminance values are adjusted to be brighter.

In some embodiments, the user may modify the composite bump by selecting and manipulating one of the two horizontal endpoints (end portions) 1440 and 1445 of the tonal adjustment graph 340. The horizontal endpoints 1440 and 1445 (at the two ends of the horizontal axis) corresponds to the minimum color component value and the maximum color component value on the tonal adjustment graph 340. The second stage 1410 illustrates the GUI 300 after the user has initiated a bump adjustment operation by selecting an endpoint. The selection of the endpoint can be performed by placing a cursor on the endpoint and providing an input (e.g., an input from a cursor controlling device or a hot key) or by performing a gesture (e.g., placing, pointing, or tapping a finger) on a device having a touch or near touch sensitive screen that displays the endpoint. As shown, the user has selected the endpoint 1440 by placing a cursor on the endpoint 1440, as indicated by the highlighting of the endpoint 1440.

The third stage 1415 illustrates the GUI 300 after the user has begun to adjust the composite bump. In some embodiments, the user may adjust the composite bump by dragging an endpoint up or down. As shown, the user has dragged the cursor down, toward the bottom of the tonal adjustment graph 340, as indicated by the arrow 1455. As a result of the drag movement, the composite bump has been adjusted. The composite bump before adjustment is depicted in dashed line. Different embodiments of the application use different techniques to adjust the composite bump based on the manipulation of an endpoint. In this example, the application modifies the adjustment value of the minimum or maximum color component value (depending on which endpoint the user has selected and manipulates) according to the user's manipulation. For example, if the user drags the end point up, the application increases the adjustment value on the composite bump that corresponds to the minimum or maximum color component value. Similarly, if the user drags the end point down, the application decreases the adjustment value on the composite bump that corresponds to the minimum or maximum color component value.

In some embodiments, the application also modifies the adjustment values on the composite bump that correspond to the other color component values, but the modification to the adjustment values decreases on the composite bump as the corresponding horizontal location is farther away from the selected end point. In addition, the application retains (does not modify) the adjustment value on the composite bump that corresponds to the unselected endpoint location. That is, an adjustment value that corresponds to a color component value that is closer to the moving endpoint gets changed more than an adjustment value that corresponds to a color component value that is farther to the moving endpoint does. And the adjustment value that corresponds to the other endpoint does not get changed at all in some embodiments.

As shown, since the user drags the cursor down in this example, the entire composite bump 1450 is adjusted. Different sections on the composite bump 1450 have different extents of adjustments. As shown, the section of the composite bump 1450 closer to the selected endpoint 1440 has larger extents of adjustments than the section of the composite bump 1450 that is farther away from the selected endpoint 1440. In addition, the point of the composite bump 1450 at the unselected endpoint 1445 is unchanged. The color values of the image 325 are also modified according to the update to the composite bump 1450 at this third stage 1415.

In this example, the user has dragged the cursor down toward the bottom of the tonal adjustment graph 340 to reduce the adjustment values along the entire composite bump 1450. In a similar manner, the user may also drag the cursor up to increase the adjustment values along the entire composite bump 1450. The fourth stage 1420 illustrates the GUI 300 after the user has further reduced the adjustment values of the composite bump 1450. As shown, the user has dragged the cursor further down toward the bottom of the tonal adjustment graph 340, as indicated by the arrow 1460. As a result, the adjustment values of the entire composite bump 1450 has been further reduced. In addition, due to the modification to the composite bump 1450, the color values of the image 325 have also been adjusted according to the updated composite bump 1450.

Figure 13A:
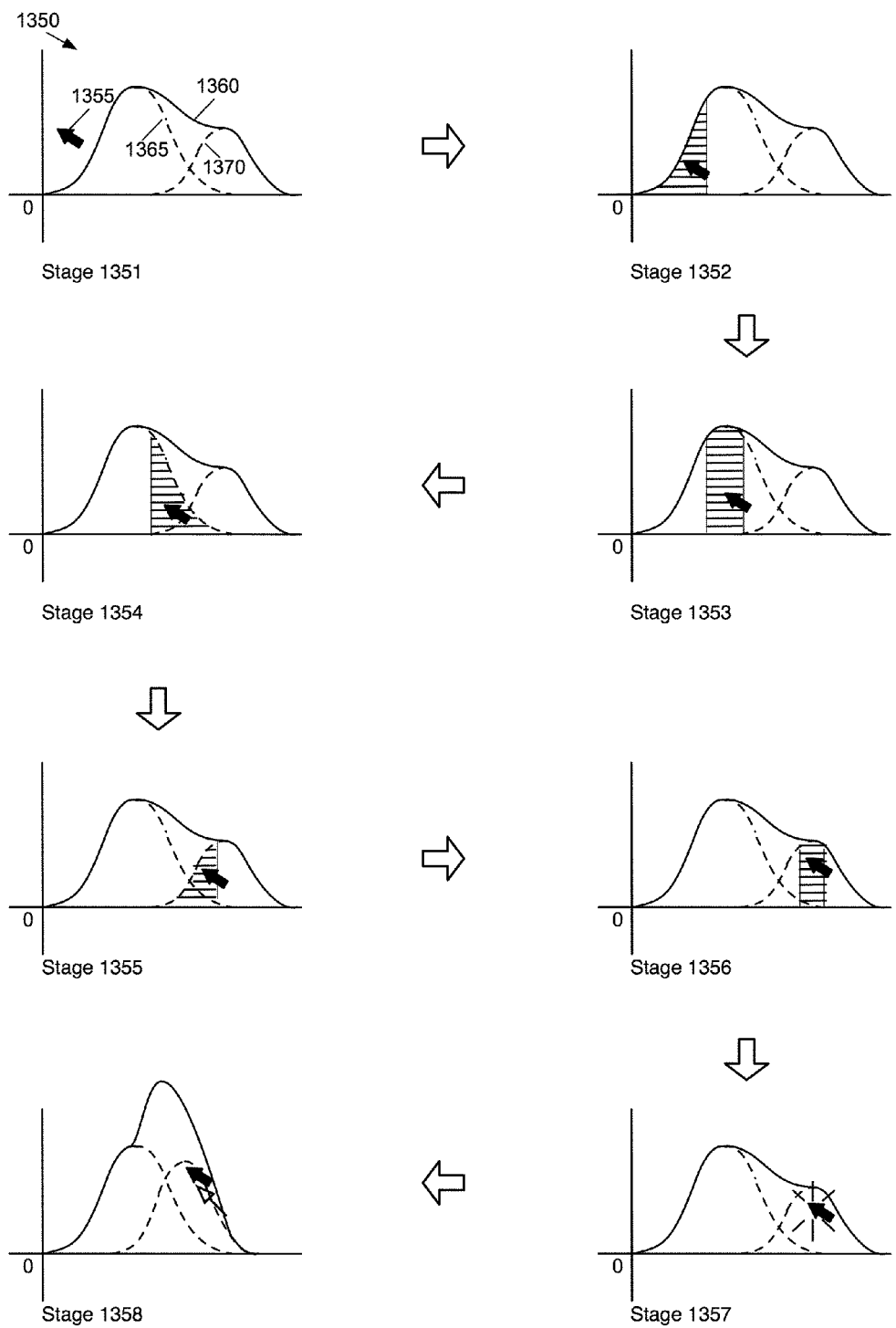
FIG. 13a illustrate an example operation of modifying one of the basic bumps of a composite bump on a tonal adjustment graph.

FIG. 13*a* illustrates an example of adjusting a composite bump on a tonal adjustment graph by adjusting one of the basic bumps that make up the composite bump. Specifically, FIG. 13*a* illustrates that the media editing application of some embodiments highlights different portions of different basic bumps of the composite bump as the cursor is hovering over the different portions of the different basic bumps. This figure also illustrates that the media editing application of some embodiments allows the user to select one of the basic bumps and modify the basic bump by selecting and dragging a portion of the basic bump. This figures illustrates a composite bump 1360 that is generated by blending two basic bumps 1365 and 1370.

The media editing application defines one or more selectable regions within a basic bump (i.e., within the area enclosed by the horizontal axis and the curve of the basic bump) that is one of several basic bumps that are blended into form a composite bump. For instance, the media editing application of some embodiments defines three regions of the basic bump—left region, middle region, and right region. The left and right regions of the basic bump in some embodiments are for adjusting the width of the basic bump. The user can select either of the left or right regions and adjust the width of the basic bump by providing a vector input. Modifying the width of the basic bump may be done in a similar manner described above by reference to FIGS. 11 and 12.

The middle region of the basic bump in some embodiments is for adjusting the height of the basic bump as well as for moving the basic bump horizontally. That is, when the user selects the middle region of the basic bump and provides a vector input that may have both a vertical component and a horizontal component, the media editing application changes the height of the basic bump based on the vertical component of the vector input and moves the basic bump horizontally along the horizontal axis of the tonal adjustment graph based on the horizontal component of the vector input.

The first stage 1351 illustrates that the user has placed a cursor 1355 on the left of the composite bump 1360. The next stage 1352 illustrates that the user has moved the cursor 1355 over the left region of the basic bump 1365. The media editing application highlights the left region of the basic bump 1365. The highlighting is depicted as horizontal lines covering the region. The user may select this region and provide a vector input in order to adjust the width of the basic bump 1365.

The third stage 1353 shows that the user has moved the cursor 1355 over the middle region of the basic bump 1365. The media editing application highlights the middle region of the basic bump 1365 as shown. The user may select this region and provide a vector input in order to adjust the height of the basic bump 1365 or move the basic bump 1365 to the left or to the right along the horizontal axis.

The next stage 1354 illustrates that the user has moved the cursor 1355 over the right region of the basic bump 1365. The media editing application highlights the right region of the basic bump 1365 as shown. The user may select this region and provide a vector input in order to adjust the width of the basic bump 1365.

The fifth stage 1355 illustrates that the user has move the cursor 1355 over the left region of the basic bump 1370. The media editing application highlights the left region of the basic bump 1370 as shown. The user may select this region and provide a vector input in order to adjust the width of the basic bump 1370.

The sixth stage 1356 shows that the user has moved the cursor 1355 over the middle region of the basic bump 1370. The media editing application highlights the middle region of the basic bump 1370 as shown. The user may select this region and provide a vector input in order to adjust the height of the basic bump 1370 or move the basic bump 1370 to the left or to the right along the horizontal axis.

The seventh stage 1357 illustrates that the user has selected the middle region of the basic bump 1370 by clicking on the middle region of the basic bump 1370. The final stage 1358 illustrates that the user has moved the cursor 1355 to the upper left direction from the position of the cursor at the previous stage 1357. The user thereby has provided a vector input that has both a vertical component and a horizontal component. The media editing application increases the height of the basic bump 1370 based on the vertical component of the vector input. The media editing application at the same time moves the basic bump 1370 to the left according to the horizontal component of the vector input. The media editing application does not change the width of the basic bump 1370. The media editing application also modifies the composite bump 1360 as the media editing application modifies the basic bump 1370. The media editing application also adjust the color values an image (not shown) based on the modified composite bump 1360.

Figure 15:
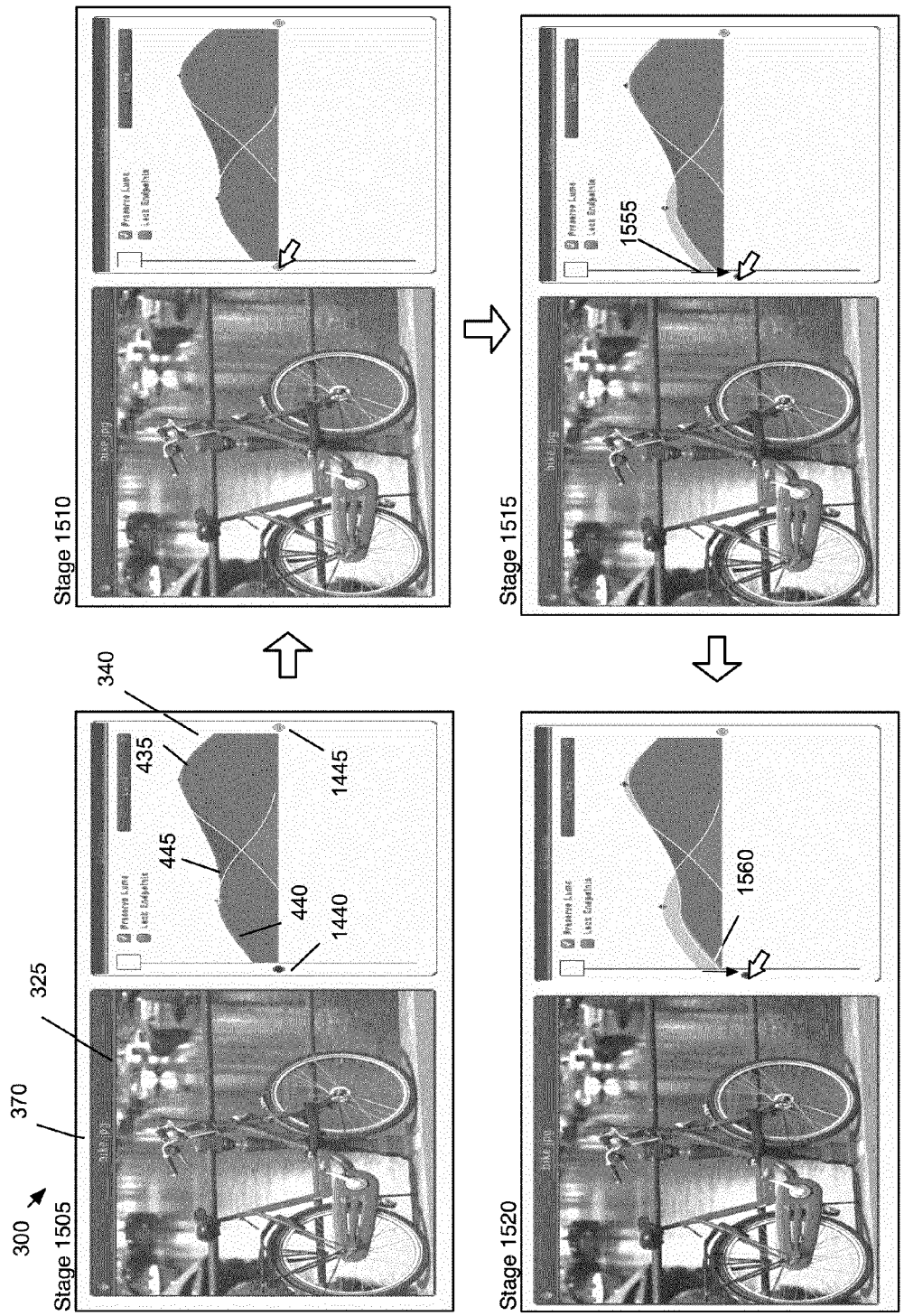
FIG. 15 illustrates another example of adjusting an entire composite bump that is made up of more than one basic bump.

FIG. 14 illustrates an example of adjusting a composite bump on a tonal adjustment graph that is made up of only one basic bump. FIG. 15 illustrates another example of adjusting an entire composite bump that is made up of more than one basic bump. Specifically, FIG. 15 illustrates an example of adjusting a composite bump by manipulating a horizontal endpoint of a tonal adjustment graph through the GUI 300 at four different stages 1505, 1510, 1515, and 1520.

The first stage 1505 is identical to the fourth stage 420 of FIG. 4. As shown, the GUI 300 displays the image 325 in the display area 370 and the tonal adjustment graph 340. The tonal adjustment graph includes two basic bumps 435 and 440 and also a composite bump 445 that is generated based on the two basic bumps 435 and 440.

The tonal adjustment graph 340 in this example has a tonal range that is defined along a luminance component. As such, the horizontal axis of the tonal adjustment graph 340 represents different luminance values of the color space in which the color values of the image 325 are defined.

In some embodiments, the user may modify the composite bump by selecting and manipulating one of the two horizontal endpoints 1440 and 1445 of the tonal adjustment graph 340. The horizontal endpoints 1440 and 1445 (at the two ends of the horizontal axis) corresponds to the minimum color component value and the maximum color component value on the tonal adjustment graph 340. The second stage 1410 illustrates the GUI 300 after the user has initiated a bump adjustment operation by selecting an endpoint. The selection of the endpoint can be performed by placing a cursor on the endpoint and providing an input (e.g., an input from a cursor controlling device or a hot key) or by performing a gesture (e.g., placing, pointing, or tapping a finger) on a device having a touch or near touch sensitive screen that displays the endpoint. As shown, the user has selected the endpoint 1440 by placing a cursor on the endpoint 1440, as indicated by the highlighting of the endpoint 1440.

The third stage 1515 illustrates the GUI 300 after the user has begun to adjust the composite bump. In some embodiments, the user may adjust the composite bump 445 by dragging an endpoint up or down. As shown, the user has dragged the cursor down, toward the bottom of the tonal adjustment graph 340, as indicated by the arrow 1555. As a result of the drag movement, the composite bump has been adjusted. When the adjusted composite bump is made up of two or more basic bumps, the application of some embodiments adjusts the basic bumps that make up the composite bump accordingly while the application of other embodiments does not adjust the basic bumps as the composite bump is adjusted.

As shown, since the user drags the cursor down in this example, the entire composite bump 445 is adjusted. Different sections on the composite bump 445 have different extents of adjustments. As shown, the section of the composite bump 445 closer to the selected endpoint 1440 has larger extents of adjustment than the section of the composite bump 445 that is farther away from the selected endpoint 1440. In addition, the point of the composite bump 1450 at the unselected endpoint 1445 is unchanged. The color values of the image 325 are also modified according to the update to the composite bump 445 at this third stage 1515.

In this example, the user has dragged the cursor down toward the bottom of the tonal adjustment graph 340 to reduce the adjustment values along the entire composite bump 445. The fourth stage 1520 illustrates the GUI 300 after the user has further reduced the adjustment values of the composite bump 445. As shown, the user has dragged the cursor further down toward the bottom of the tonal adjustment graph 340, as indicated by the arrow 1560. As a result, the adjustment values of the entire composite bump 445 has been further reduced. In addition, due to the modification to the composite bump 445, the color values of the image 325 have also been adjusted according to the updated composite bump 445. In a similar manner, the user may also drag the cursor up to increase the adjustment values along the entire composite bump 445.

Figure 16:
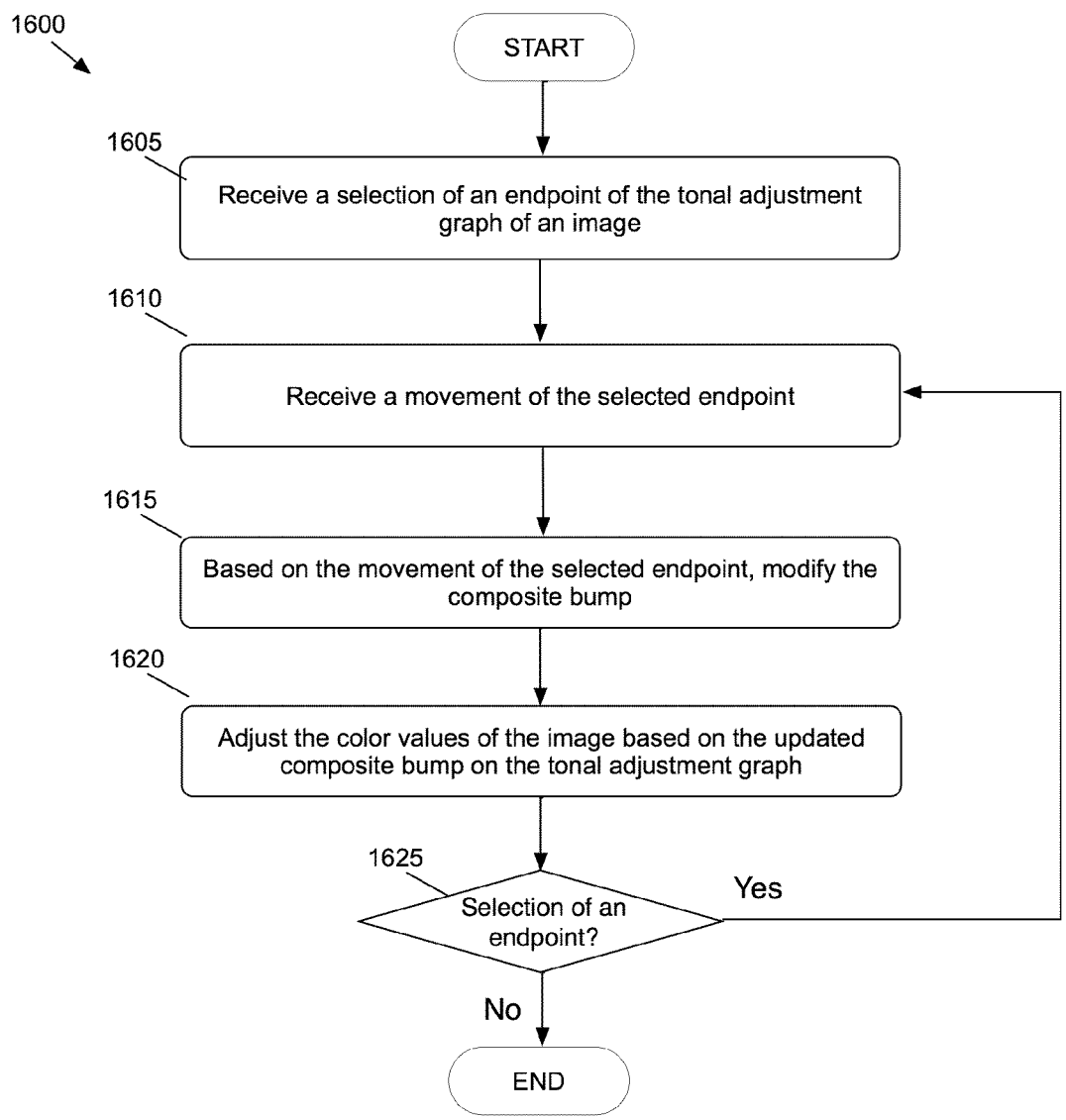
FIG. 16 conceptually illustrates a process for adjusting the composite bump based on a set of user inputs.

FIG. 16 conceptually illustrates a process 1600 for adjusting the composite bump based on a set of user inputs. In some embodiments, the process is performed by the media editing application 700 of FIG. 7. The process 1600 begins by receiving (at 1605) a selection of an endpoint on the tonal adjustment graph of an image. As mentioned, the endpoints correspond to the minimum or the maximum color component value on the tonal adjustment graph.

Next, the process receives (at 1610) a set of inputs on the selected endpoint. In some embodiments, the user may adjust composite bump by dragging the selected endpoint up or down. The process then (at 1615) adjusts the composite bump based on the set of inputs. In some embodiments, the section of the composite bump closer to the selected endpoint has larger extents of adjustments than the section of the composite bump that is farther away from the selected endpoint. In addition, the point of the composite bump at the unselected endpoint is unchanged.

After adjusting the composite bump, the process then re-adjusts (at 1620) the color values of the image based on the updated composite bump on the tonal adjustment graph. In some embodiments, the process adjusts the color values of the image by performing a computation using the adjustment values of the adjusted composite bump (e.g., multiplying the color values by the corresponding adjustment values, adding the corresponding adjustment values to the color values, using a function that takes as inputs the color values and the corresponding adjustment values and outputs the adjusted color values, etc.)

The process then determines (at 1625) whether an endpoint is selected. If another endpoint is selected, the process returns to 1610 to receive another set of inputs for modifying the composite bump. The process will cycle through operations 1610-1625 until no more endpoint is selected. If no more endpoint is selected, the process ends.

II. Color Component Selection for Tonal Graphs

Figure 17:
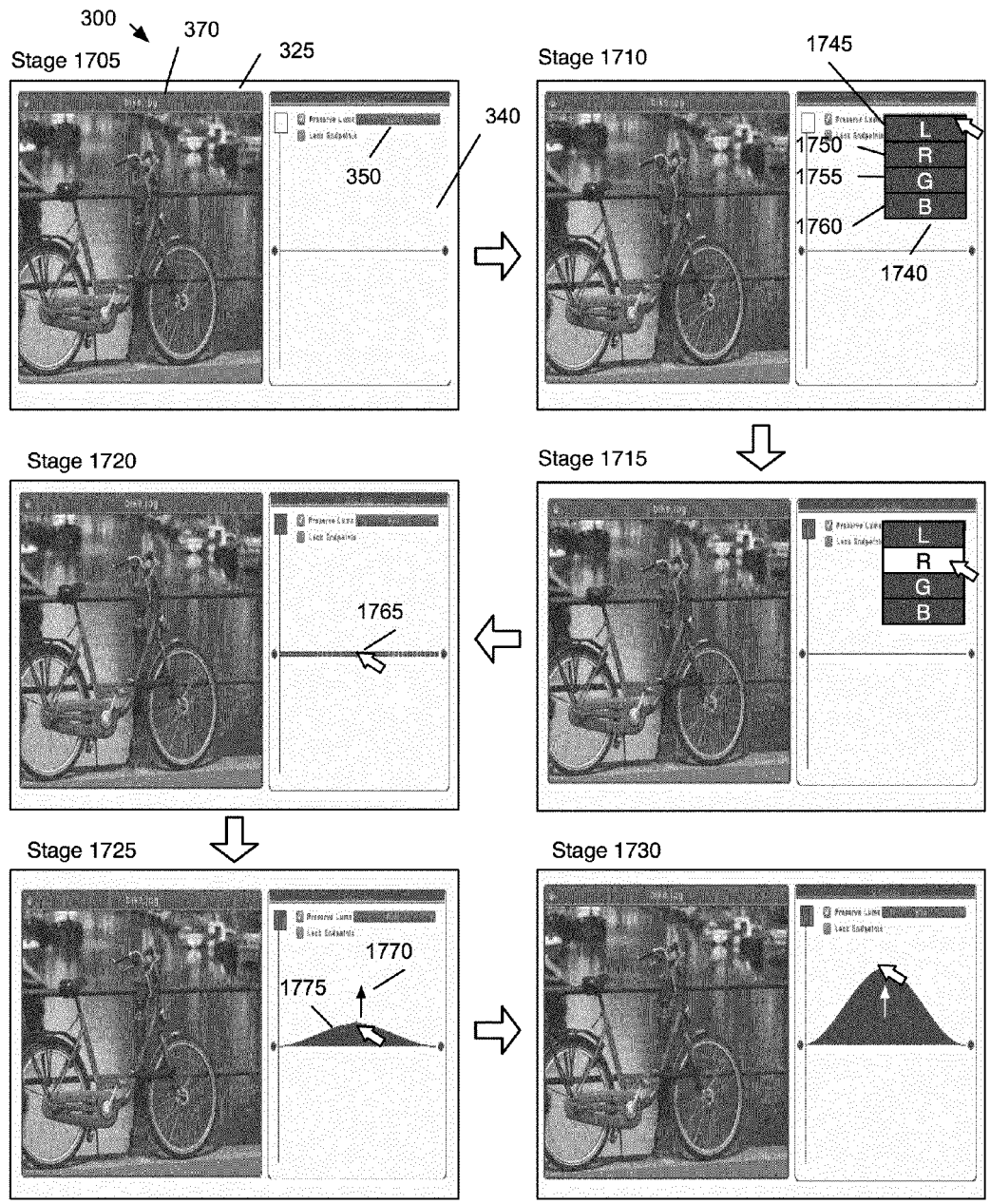
FIG. 17 illustrates a color component selection tool in a GUI that allows a user to select one of the primary color component or the luminance component.

As mentioned above, the tonal range of the tonal adjustment graph can be defined along one of the primary color components or the luminance component. In the examples illustrated above by reference to FIGS. 3, 4, 5, 11, 12, 14, and 15, the tonal ranges of the tonal adjustment graphs are defined along the luminance component. The media editing application of some embodiments allows a user to select a different primary color component for the tonal range of the tonal adjustment graph through the GUI. Different embodiments of the application implement different tools for allowing a user to select a different color component. In one approach, the application provides a color component selection tool in the GUI that allows a user to select one of the primary color component or the luminance component. FIG. 17 illustrates an example of such an approach. Specifically, FIG. 17 illustrates the operation of selecting a different color component for the tonal adjustment graph through the GUI 300 at six different stages 1705, 1710, 1715, 1720, 1725, and 1730.

The first stage 1705 is identical to the first stage 305 of FIG. 3. As shown, the GUI 300 displays the image 325 in the display area 370 and the tonal adjustment graph 340. The GUI 300 also displays a selectable UI item 350 for invoking a color component selection tool for selecting a color component for the tonal adjustment graph 340. In some embodiments, the application also displays the current selection of color component for the tonal adjustment graph on the GUI. For example, the application may display the current selection of color component "luma" on the selectable UI item 350.

The second stage 310 illustrates the GUI 300 after the user has invoked the color component selection tool. As shown, the user has invoked the color component selection tool by selecting the selectable UI item 350. Different embodiments implement the color component selection tool differently. In this example, the color component selection tool is implemented as a drop down menu. As shown, after the user has selected the selectable UI item 350, a drop down menu 1740 is displayed in the GUI 300. The drop down menu 1740 includes four selectable UI items for selecting the luminance component or one of the three primary color components. For example, the selectable UI item 1745 labeled "L" is associated with the luminance component, the selectable UI item 1750 labeled "R" is associated with the red primary color component, the selectable UI item 1755 labeled "G" is associated with the green primary color component, and the selectable UI item 1750 labeled "B" is associated with the blue primary color component.

The third stage 1715 illustrates the GUI 300 after the user has selected the selectable UI item 1750. As a result, the application modifies the tonal adjustment graph 340 such that the tonal range is now defined along the red primary color component instead of the luminance component. That is, the horizontal axis of the tonal adjustment graph 340 now represents different color values along the red primary color component (i.e., different red color values). The far left of the horizontal axis represents a color of black (i.e., a red color value of zero). The red color values increase from the left to the right on the horizontal axis and the far right of the horizontal axis represents a maximum red color value.

The fourth stage 1720 illustrates the GUI 300 when a user has begun to create a bump on the tonal adjustment graph 340 by specifying a center location of the basic bump on the tonal adjustment graph 340. In some embodiments, the application allows the user to specify a center location of a basic bump by selecting a baseline location on the tonal adjustment graph (e.g., a location that corresponds to a particular color value along the color component). The selection of a baseline location may be performed by placing a cursor at the baseline location and providing an input (e.g., an input from a cursor controlling device or a hot key) or by performing a gesture (e.g., placing, pointing, or tapping a finger) at the baseline location on a device having a touch or near touch sensitive screen. As shown in the fourth stage 1720, the user has specified the center location for the basic bump by placing a cursor at location 1765 on the horizontal axis of the tonal adjustment graph 340 and providing an input. The selection is also indicated by the highlighting of the horizontal axis of the tonal adjustment graph 340.

The fifth stage 1725 illustrates the GUI 300 after the user has begun to specify a height for the basic bump. In some embodiments, the application allows the user to specify a height for the basic bump by providing a vector on the tonal adjustment graph. In these embodiments, the magnitude of the vector corresponds to the height of the basic bump (i.e., the larger the magnitude, the higher the basic bump). The vector can be provided by dragging a cursor in a direction on the tonal adjustment graph or by performing a gesture (e.g., dragging a finger) on a device having a touch or near touch sensitive screen that displays the tonal adjustment graph. As shown, the user has provided a vector on the tonal adjustment graph 340 by dragging the cursor upward, toward the top of the tonal adjustment graph 340, as indicated by the arrow 1770. As a result of the drag movement, the application generates a basic bump 1775 on the tonal adjustment graph 340. Specifically, the basic bump 1775 has a center that corresponds to the selected baseline location 1765 and a height that corresponds to the user provided vector.

In this example, the basic bump 1775 corresponds different color values along the red primary color component on the tonal adjustment graph 340 to different adjustment values. As shown, the basic bump 1775 specifies that the color values that are represented at locations around the selected baseline location 1765 (i.e., mid-tone colors) have a larger positive adjustments than the luminance values that are represented at locations that are farther away from the selected baseline location 1765 (i.e., dark or bright colors). In some embodiments, the application adjusts the color values of the image 325 based on the basic bump 1775. As shown, the color values of the image 325 (especially those with mid-tone colors) have been changed to become more red.

The sixth stage 1730 illustrates the GUI 300 after the user has moved the cursor further upward on the tonal adjustment graph 340. The cursor movement specifies a new height for the basic bump 1775. As a result, the application adjusts the height of the basic bump 1775 according to the new vector. The application also re-adjusts the color values of the image 325 based on the modified basic bump 1775. As shown, the color values of the image 325 (especially those having midtone) in the sixth stage 1730 is shown to be even more red than the color values of the image 325 in the fifth stage 1725.

FIG. 17 above illustrates an example of changing the color component along which the tonal adjustment graph is defined to a red color component. In some embodiments, the user may selects other primary color components (e.g., the green color component, the blue color component, etc.) using similar techniques.

In addition to selecting a primary color component or a luminance component for the tonal adjustment graph, some embodiments of the application also allow the user to define the tonal range along a custom color component that is not one of the primary color components or the luminance component of the color space. Specifically, a custom color component is a composite of two or more primary color components. Each of the primary color contributes a specific fraction that makes up the custom color component.

Figure 18:
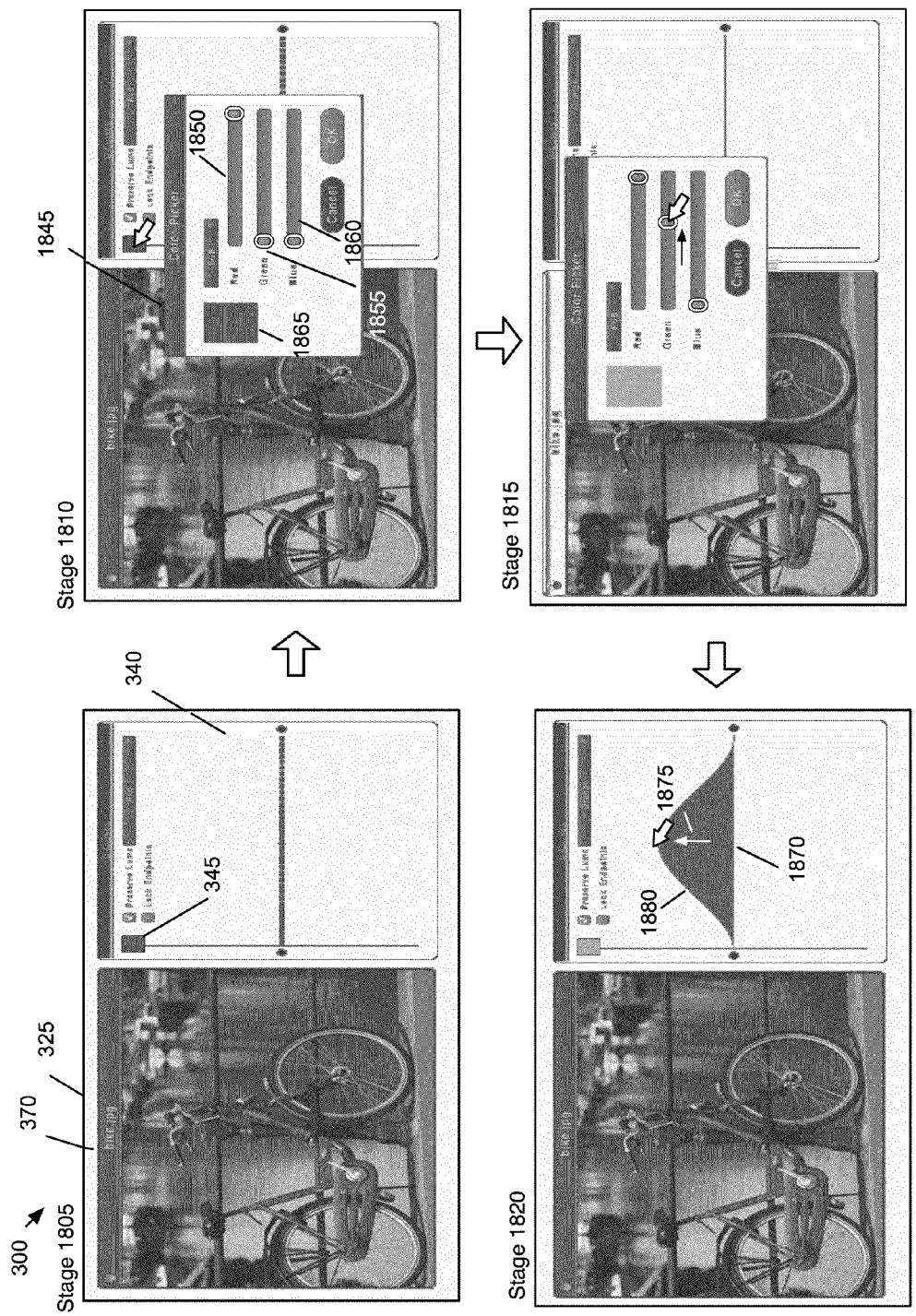
FIG. 18 illustrates an example of selecting a custom color component for a tonal adjustment graph by adjusting the range sliders.

Different embodiments provide different UI tools for allowing the user to select a custom color component. For example, the application of some embodiments provides a set of range sliders that each associated with a primary color component. By adjusting the range sliders, the user can specify a particular fraction for each primary color component that contributes to the custom color component. FIG. 18 illustrates an example of selecting a custom color component for a tonal adjustment graph by adjusting the range sliders through the GUI 300 at four different stages 1805, 1810, 1815, and 1820.

As shown in the first stage 1805 of FIG. 18, the GUI 300 displays an image 325 in the display area 370, the tonal adjustment graph 340, and also the selectable UI item 345 for invoking the custom color component selection tool. The tonal adjustment graph 340 in this example includes a tonal range that is defined along the red primary color component. The second stage 1810 illustrates the GUI 300 after the user has invoked the custom color component selection tool. As shown, the user has invoked the custom color component selection tool by selecting the selectable UI item 345. As a result, a new window 1845 appears in the GUI 300. The window 1845 includes three UI controls 1850-1860, and a display area 1865 for displaying the color component that has been selected by the user. The three UI controls 1850-1860 allow a user to select a custom color component for the tonal adjustment graph by specifying a fractional contribution for each primary color component. For example, the user can adjust the UI control 1850 to specify a fractional contribution for the red color component, the user can adjust the UI control 1855 to specify a fractional contribution for the green color component, and the user can also adjust the UI control 1860 to specify a fractional contribution for the blue color component. Although the UI controls 1850-1860 are implemented as range sliders in this example, the application of other embodiments may provide different types of range related UI controls (e.g., dials, buttons, number fields, and the like) for specifying the fractional contributions of the primary color components.

As shown in the second stage 1810, since the tonal range of the tonal adjustment graph 340 is currently defined along the red primary color component, only the UI control 1850 (i.e., associated with the red color component) shows a maximum value while the UI controls 1855 and 1860 (associated with the green and blue color component respectively) show a minimum value. As such, the display area 1865 displays a pure red color indicating that the selected color component is a pure red color component.

The third stage 1815 illustrates the GUI 300 after the user has specified a different custom color component. As shown, the user has moved a knob 230 of the UI control 1855 (associated with the green color component) toward the right, thereby increasing the fractional contribution by the green color component. As shown in the display area 1865, the custom color component is now an orange color, which is a composite of the red color component and the green color component. Specifically, the custom color component that is specified in the third stage 1815 includes a larger fractional contribution from the red color component and a smaller fractional contribution from the green color component.

The fourth stage 1820 illustrates the GUI 300 after the user has created a basic bump on the tonal adjustment graph 340. As shown, the user has selected a baseline location 1870 on the horizontal axis of the tonal adjustment graph 340, and provided a vector, as indicated by the arrow 1875. Based on the user's input (i.e., the selected baseline location and the vector), the application creates a basic bump 1880 on the tonal adjustment graph 340. As mentioned above, the bump 1880 on the tonal adjustment graph 340 corresponds different color values within a tonal range along a particular color component to different adjustment values. The application then adjusts the color values of the image 325 based on the bump 1880. In some embodiments, before adjusting the color values of the image 325, the application breaks down the composite bump 1880 into several curves for the primary color components that have contributed to the custom color component. In this example, the application uses the composite bump 1880 to generate a curve for the red color component and a curve for the green color component. In some of these embodiments, the application breaks down the composite bump 1880 according to the fractional contribution of each primary color component to make up the custom color component. Thus, if the application determines that the custom color component is made up of sixty percent (60%) of the red color component and forty percent (40%) of the green color component, the application creates a curve for the red color component that is sixty percent of the composite bump 1880 and a curve for the green color component that is forty percent of the composite bump 1880. Thus, when the composite bump 1880 corresponds a particular color value to a value "x" on the tonal adjustment graph 340, the curve for the red component corresponds the particular color value to a value equals to sixty percent of "x", and the curve for the green color component corresponds the particular color value to a value equals to forty percent of "x".

The application then adjusts the color values of the image 325 based on these curves that are generated for each primary color component. As shown, the colors of the image 325 (especially those having mid-tone colors) have been modified to become more orange.

Figure 19:
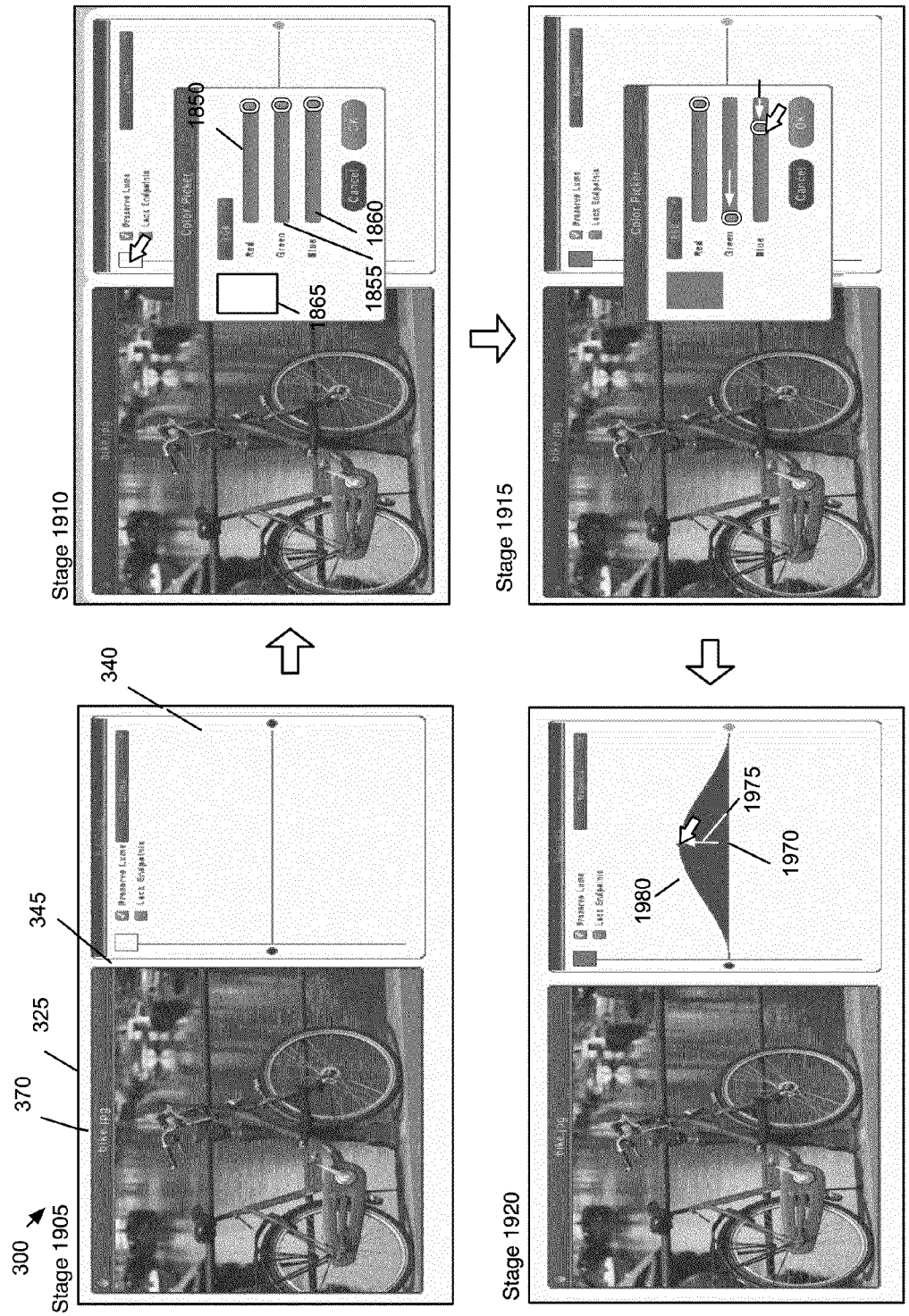
FIG. 19 illustrates another example of selecting a custom color component for a tonal adjustment graph using the range sliders.

FIG. 19 illustrates another example of selecting a custom color component for a tonal adjustment graph using the range sliders through the GUI 300 at four different stages 1905, 1910, 1915, and 1920.

The first stage 1905 is identical to the first stage 305 of FIG. 3. As shown, the GUI 300 displays the image 325 in the display area 370, the tonal adjustment graph 340, and also the selectable UI item 345 for invoking the custom color component selection tool. The tonal adjustment graph 340 in this example includes a tonal range that is defined along the luminance color component. The second stage 1910 illustrates the GUI 300 after the user has invoked the custom color component selection tool. As shown, the user has invoked the custom color component selection tool by selecting the selectable UI item 345. As a result, a new window 1845 appears in the GUI 300. The window 1845 includes three UI controls 1850-1860, and a display area 1865 for displaying the color component that has been selected by the user. The three UI controls 1850-1860 allow a user to select a custom color component for the tonal adjustment graph by specifying a fractional contribution for each primary color component. For example, the user can adjust the UI control 1850 to specify a fractional contribution for the red color component, the user can adjust the UI control 1855 to specify a fractional contribution for the green color component, and the user can also adjust the UI control 1860 to specify a fractional contribution for the blue color component. Although the UI controls 1850-1860 are implemented as range sliders in this example, the application of other embodiments may provide different types of range related UI controls (e.g., dials, buttons, number fields, and the like) for specifying the fractional contributions of the primary color components.

As shown in the second stage 1910, since the tonal range of the tonal adjustment graph 340 is currently defined along the luminance color component, all three UI controls 1850-1860 shows a maximum value. As such, the display area 1865 displays a pure white color indicating that the selected color component is a luminance color component.

The third stage 1915 illustrates the GUI 300 after the user has specified a different custom color component. As shown, the user has moved the knob of the UI control 1855 (associated with the green color component) to specify a minimum value, thereby removing the contribution of the green color component to the custom color component. The user has also moved the knob of the UI control 1860 (associated with the blue color component) toward the left, thereby decreasing the fractional contribution by the blue color component. As shown in the display area 1865, the custom color component is now a purple color, which is a composite of the red color component and the blue color component. Specifically, the custom color component that is specified in the third stage 1915 includes a larger fractional contribution from the red color component and a smaller fractional contribution from the blue color component.

The fourth stage 1920 illustrates the GUI 300 after the user has created a basic bump on the tonal adjustment graph 340. As shown, the user has selected a baseline location 1970 on the horizontal axis of the tonal adjustment graph 340, and provided a vector, as indicated by the arrow 1975. Based on the user's input (i.e., the selected baseline location and the vector), the application creates a basic bump 1980 on the tonal adjustment graph 340. As mentioned above, the bump 1980 on the tonal adjustment graph 340 corresponds different color values within a tonal range along a particular color component to different adjustment values. The application then adjusts the color values of the image 325 based on the bump 1980. In some embodiments, before adjusting the color values of the image 325, the application breaks down the composite bump 1980 into several curves for the primary color components that have contributed to the custom color component. In this example, the application uses the composite bump 1980 to generate a curve for the red color component and a curve for the blue color component. In some of these embodiments, the application breaks down the composite bump 1980 according to the fractional contribution of each primary color component to make up the custom color component. Thus, if the application determines that the custom color component is made up of sixty percent (60%) of the red color component and forty percent (40%) of the blue color component, the application creates a curve for the red color component that is sixty percent of the composite bump 1980 and a curve for the blue color component that is forty percent of the composite bump 1980. Thus, when the composite bump 1980 corresponds a particular color value to a value "y" on the tonal adjustment graph 340, the curve for the red component corresponds the particular color value to a value equals to sixty percent of "y", and the curve for the blue color component corresponds the particular color value to a value equals to forty percent of "y".

The application then adjusts the color values of the image 325 based on these curves that are generated for each primary color component. As shown, the colors of the image 325 (especially those having mid-tone colors) have been modified to become more purple.

Figure 20:
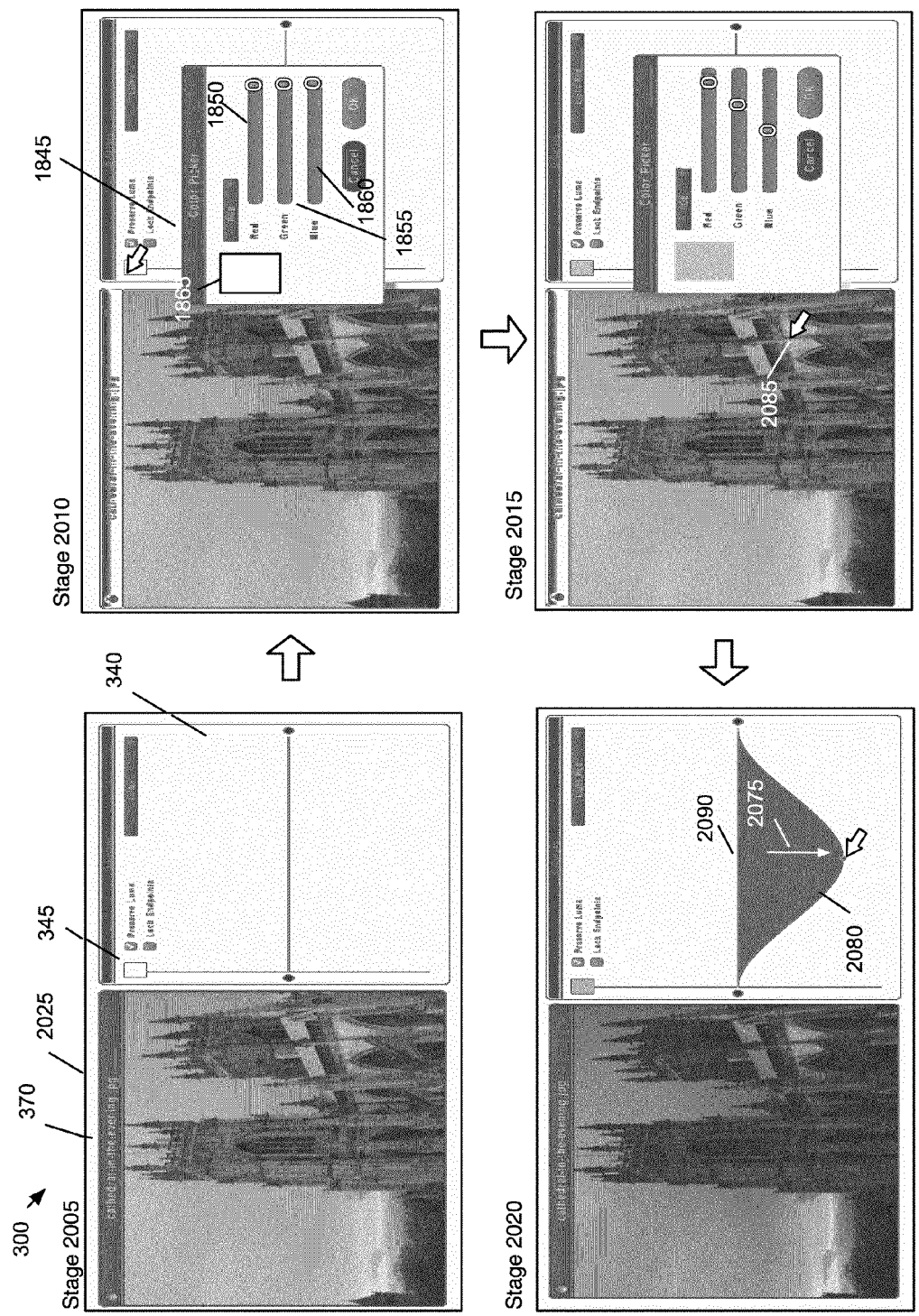
FIG. 20 illustrates an example of specifying a custom color component for a tonal adjustment graph by selecting a location on a displayed image.

FIGS. 18 and 19 above illustrates two examples of selecting a custom color component for the tonal adjustment graph by manipulating a set of range sliders that area associated with the primary color components of the color space. Instead of or in addition to the range sliders, some embodiments also allow a user to specify a custom color component by selecting a location on a displayed image. The application corresponds the selected location to a particular pixel of the image, and uses the color values of the particular pixel to determine a custom color component. FIG. 20 illustrates an example of specifying a custom color component for a tonal adjustment graph by selecting a location on a displayed image. Specifically, FIG. 20 illustrates an example custom color component selection operation through the GUI 300 at four different stages 2005, 2010, 2015, and 2020.

As shown in the first stage 2005 of FIG. 20, the GUI 300 displays a display area 370 for displaying an image being edited, the tonal adjustment graph 340, and also the selectable UI item 345 for invoking a custom color component selection tool. In this example, the display area 370 displays an image 2025, which is a picture of a castle.

The second stage 2010 illustrates the GUI 300 after the color selection tool is invoked. As shown, the user has invoked the color selection tool by selecting the selectable UI item 345. As a result, a new window 1845 appears in the GUI 300. The window 1845 includes three UI controls 1850-1860, and a display area 1865 for displaying the color component that has been selected by the user. The three UI controls 1850-1860 allow a user to select a custom color component for the tonal adjustment graph by specifying a fractional contribution for each primary color component. For example, the user can adjust the UI control 1850 to specify a fractional contribution for the red color component, the user can adjust the UI control 1855 to specify a fractional contribution for the green color component, and the user can also adjust the UI control 1860 to specify a fractional contribution for the blue color component. Although the UI controls 1850-1860 are implemented as range sliders in this example, the application of other embodiments may provide different types of range related UI controls (e.g., dials, buttons, number fields, and the like) for specifying the fractional contributions of the primary color components.

In addition to using the UI controls 2050-2060, the application also allows the user to specify a custom color component by selecting a location on the image 2025. When a user selects a location on the image, the application identifies a custom color component based on the color values of the pixel that corresponds to the selected location on the image. In some embodiments, the selection of a location on the image can be performed by placing a cursor at the location on the image 2025 and providing an input (e.g., an input from a cursor controlling device or a hot key) or by performing a gesture (e.g., placing, pointing, or tapping a finger) on a device having a touch or near touch sensitive screen that displays the image 2025. The third stage 2015 illustrates the GUI 300 after the user has specified a custom color component. As shown, the user has specified a custom color component by selecting a location 2085 on the image 2025. Since the location 2085 displays an orange color, the display area 1865 displays the orange color that corresponds the color of the selected location 2085 on the image 2025. The third stage 2015 also illustrates that the UI controls 1850-1860 are also modified according to the newly selected custom color component. As shown, the UI controls 1850-1860 shows different fractional contribution from each of the primary color components that make up the new custom color component. The UI controls 1850-1860 indicate that the custom color component contains a larger fractional contribution from the red color component, a lesser fractional contribution from the green color component and a even lesser fractional contribution from the blue color component.

The fourth stage 2020 illustrates the GUI 300 after the user has created a basic bump. As shown, the user has selected a baseline location 2090 provided a vector, as indicated by the arrow 2075. Based on the user's input (i.e., the selected baseline location and the vector), the application creates a basic bump 2080 on the tonal adjustment graph 340. As mentioned above, the bump 2080 on the tonal adjustment graph 340 corresponds different color values within a tonal range along a particular color component to different adjustment values. The application then adjusts the color values of the image 2025 according to the bump 2080. As shown, the orange color values of the image 2025 (especially those having mid-tone colors) have been modified to become less orange.

Figure 21:
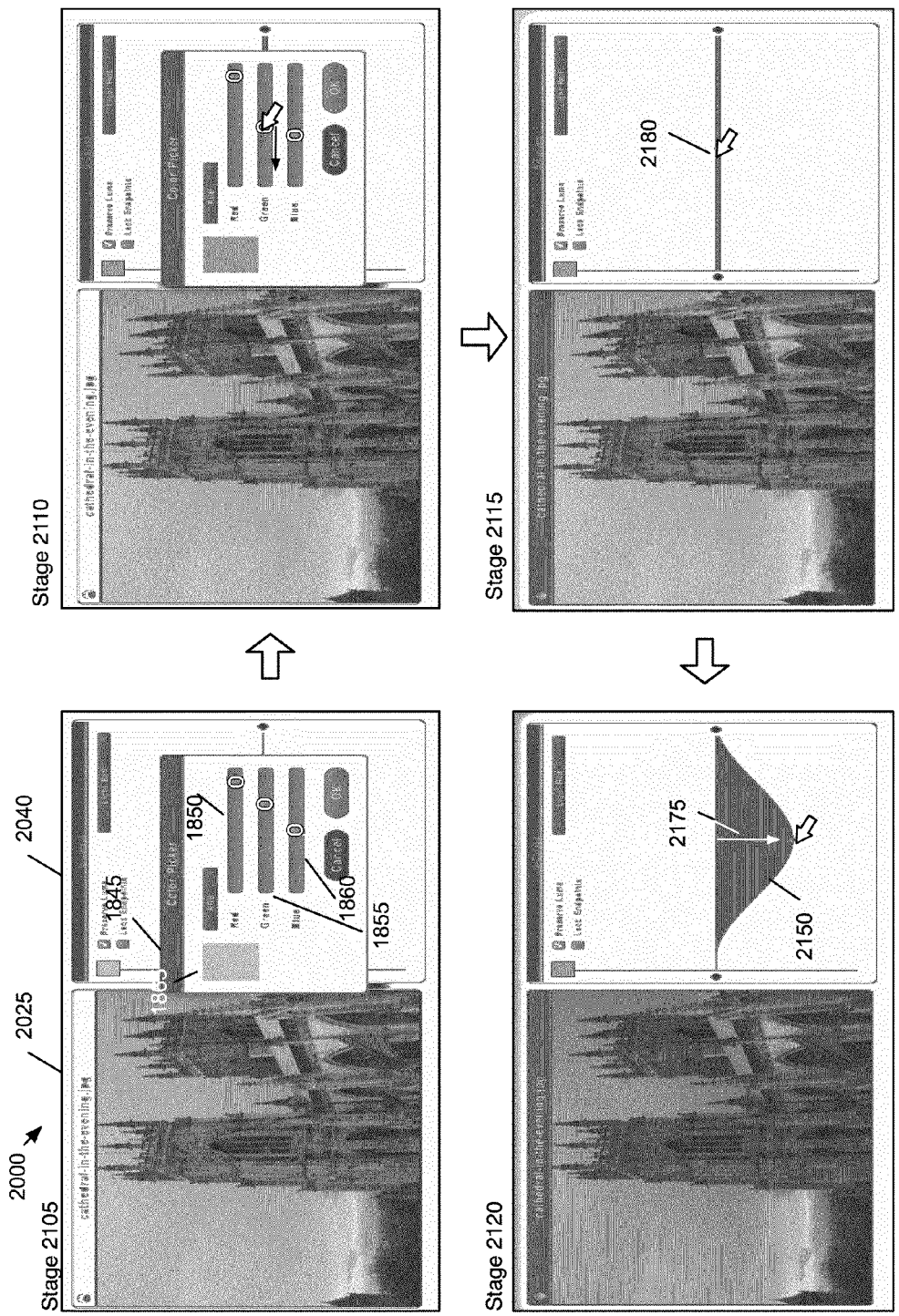
FIG. 21 illustrates an example of adjusting a custom color component after the user has specified the custom color component by selecting a location on the displayed image.

After specifying a custom color component for a tonal adjustment graph, the application of some embodiments allow the user to adjust the custom color component after a custom color component is specified. FIG. 21 illustrates an example of adjusting a custom color component after the user has specified the custom color component by selecting a location on the displayed image. Specifically, FIG. 21 illustrates an example operation of adjusting a custom color component through the GUI 300 at four different stages 2105, 2110, 2115, and 2120.

The first stage 2105 is identical to the third stage 2015 of FIG. 20. As shown, the GUI 300 displays the image 2025 in the display area 370 and the tonal adjustment graph 340. The GUI 300 also shows a window 1845 that includes three UI controls 1850-1860, and a display area 1865 for displaying the color component that has been selected by the user. The three UI controls 1850-1860 allow a user to select a custom color component for the tonal adjustment graph by specifying a fractional contribution for each primary color component. The display area 1865 displays an orange color that corresponds the color selected by the user. In addition, the UI controls 2050-2060 also show the different fractional contribution from each of the primary color components that make up this custom color component. Specifically, the UI controls 2050-2060 indicate that the custom color component contains a larger fractional contribution from the red color component, a lesser fractional contribution from the green color component and a even lesser fractional contribution from the blue color component. In some embodiments, the custom color component is specified by selecting a location on the image 2025.

The second stage 2110 illustrates the GUI 300 after the user has modified the existing custom color component. In some embodiments, the application allows the user to modify the custom color component by manipulate the UI controls 1850-1860. As shown, the user has modified the custom color component by moving the knob of the UI control 1855 (associated with the green color component) to the left, thereby decreasing the fractional contribution of the green color component to the custom color component. As a result, the display area 1865 now displays a pinkish color instead of an orange color.

The third stage 2115 illustrates the GUI 300 after the user has begun to create a basic bump on the tonal adjustment graph 340. As shown, the user has selected a baseline location 2180 on the horizontal axis of the tonal adjustment graph 340, as indicated by the highlighting of the horizontal axis of the tonal adjustment graph 340. The fourth stage 2120 illustrates the GUI 300 after the user has provided a vector input. As shown, the user has provided a vector input by dragging the cursor down toward the bottom of the tonal adjustment graph 340, as indicated by the arrow 2175. As a result of the user inputs, the application has created a basic bump 2150 on the tonal adjustment graph 340. As mentioned above, the bump 2150 on the tonal adjustment graph 340 corresponds different color values within a tonal range along a particular color component to different adjustment values. The application then adjusts the color values of the image 2025 based on the bump 2150 in the same manner as described above by reference to FIGS. 18, 19, and 20. As shown, the colors of the image 325 (especially those having mid-tone colors) have been modified to become less pink.

Figure 22:
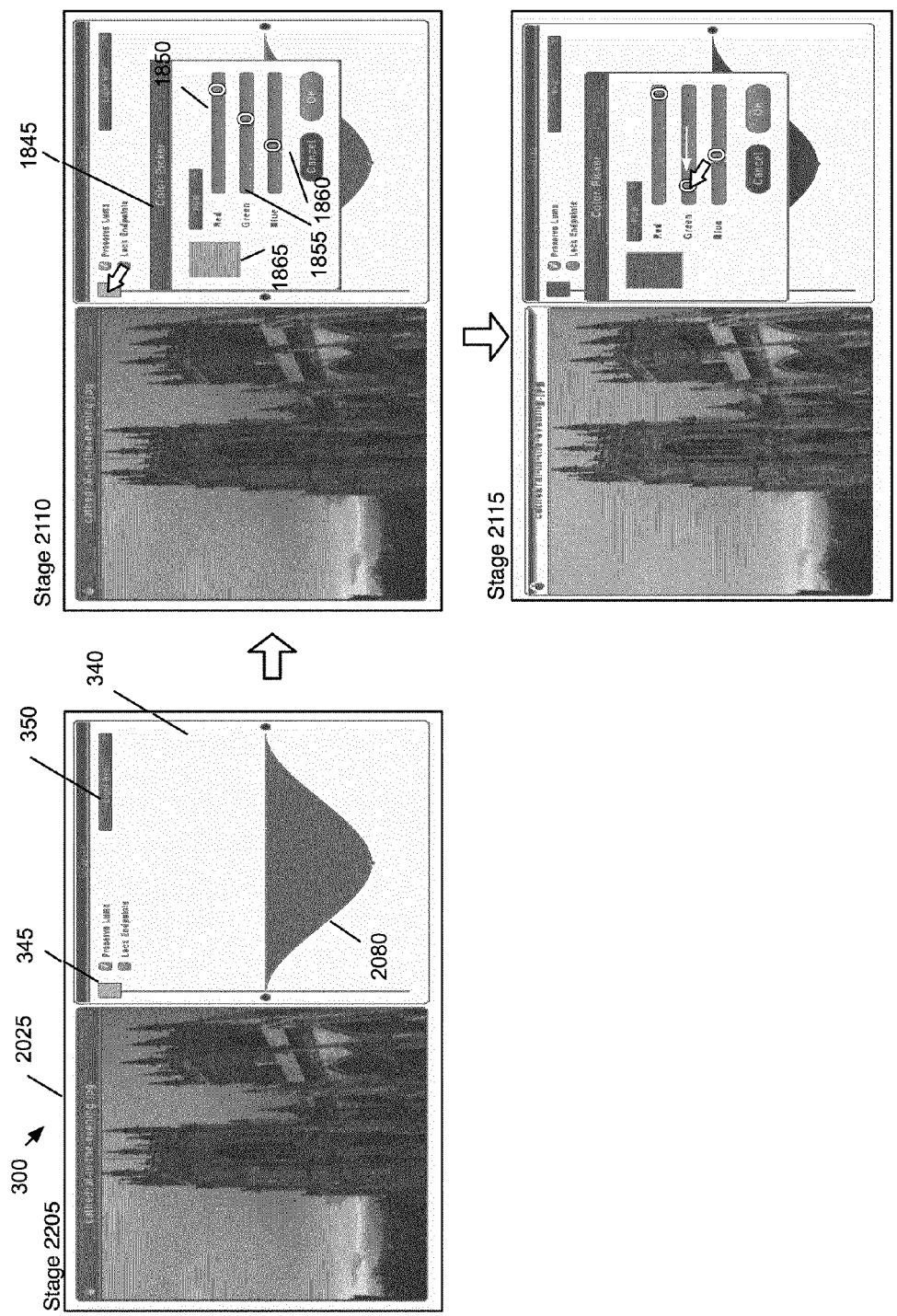
FIG. 22 illustrates an example of modifying a custom color component on a tonal adjustment graph after a basic bump is created on the tonal adjustment graph.

In some embodiments, the application allows the user to modify the custom color component even after a set of basic bumps have been created on the tonal adjustment graph. FIG. 22 illustrates such an example. Specifically, FIG. 22 illustrates an example of modifying a custom color component on a tonal adjustment graph after a basic bump is created on the tonal adjustment graph through the GUI 300 at three stages 2205, 2210, and 2215.

The first stage 2205 is identical as the fourth stage 2020 of FIG. 20. As shown, the GUI 300 displays the image 2025, the tonal adjustment graph 340, and also the selectable UI item 345 for invoking a custom color component selection tool. The first stage 2205 also shows that a basic bump 2080 has been created on the tonal adjustment graph 340.

The second stage 2210 illustrates the GUI 300 after the user has invoked the custom color component selection tool. As shown, the user has invoked the custom color component selection tool by selecting the selectable UI item 345. As a result, a window a new window 1845 appears in the GUI 300. The window 1845 includes three UI controls 1850-1860, and a display area 1865 for displaying the color component that has been selected by the user. The three UI controls 1850-1860 allow a user to select a custom color component for the tonal adjustment graph by specifying a fractional contribution for each primary color component. For example, the user can adjust the UI control 1850 to specify a fractional contribution for the red color component, the user can adjust the UI control 1855 to specify a fractional contribution for the green color component, and the user can also adjust the UI control 1860 to specify a fractional contribution for the blue color component. Although the UI controls 1850-1860 are implemented as range sliders in this example, the application of other embodiments may provide different types of range related UI controls (e.g., dials, buttons, number fields, and the like) for specifying the fractional contributions of the primary color components.

The second stage 2210 also illustrates that the UI controls 1850-1860 shows the different fractional contributions from the primary color components that make up the currently specified custom color component. In this example, the UI controls 1850-1860 indicate that the custom color component contains a larger fractional contribution from the red color component, a lesser fractional contribution from the green color component and a even lesser fractional contribution from the blue color component.

The third stage 2215 illustrates the GUI 300 after the user has modified the custom color component. As shown, the user has modified the custom color component by dragging the knob of the UI control 1855 (associated with the green color component) to the left. As a result, the custom color component is changed from an orange color to a pink color, as shown in the display area 1865. The third stage 2215 also illustrates that after the custom color component is modified, the application of some embodiments re-adjusts the color values of the image 2025 according to the bump 2080 based on the newly defined custom color component.

FIGS. 21 and 22 above illustrate examples of modifying a custom color component that has been previously specified by a user (either by manipulating the UI controls or selecting a location on the image). In addition to modifying an existing custom color component, the application of some other embodiments allow the user to specify more than one custom color components and create bumps that are based on the different custom color components. In these embodiments, the application provides a tool (such as the color component selection tool 350) to allow the user to display the tonal adjustment graph along the different custom color components that have been previously specified by the user.

FIGS. 18, 19, 20, 21, and 22 above illustrate examples of specifying (or defining) custom color components for the tonal adjustment graph. However, the application of some other embodiments allows the user to use the same manner to specify a custom color component for other tonal graph, such as a response graph, for editing color values of an image.

Figure 23:
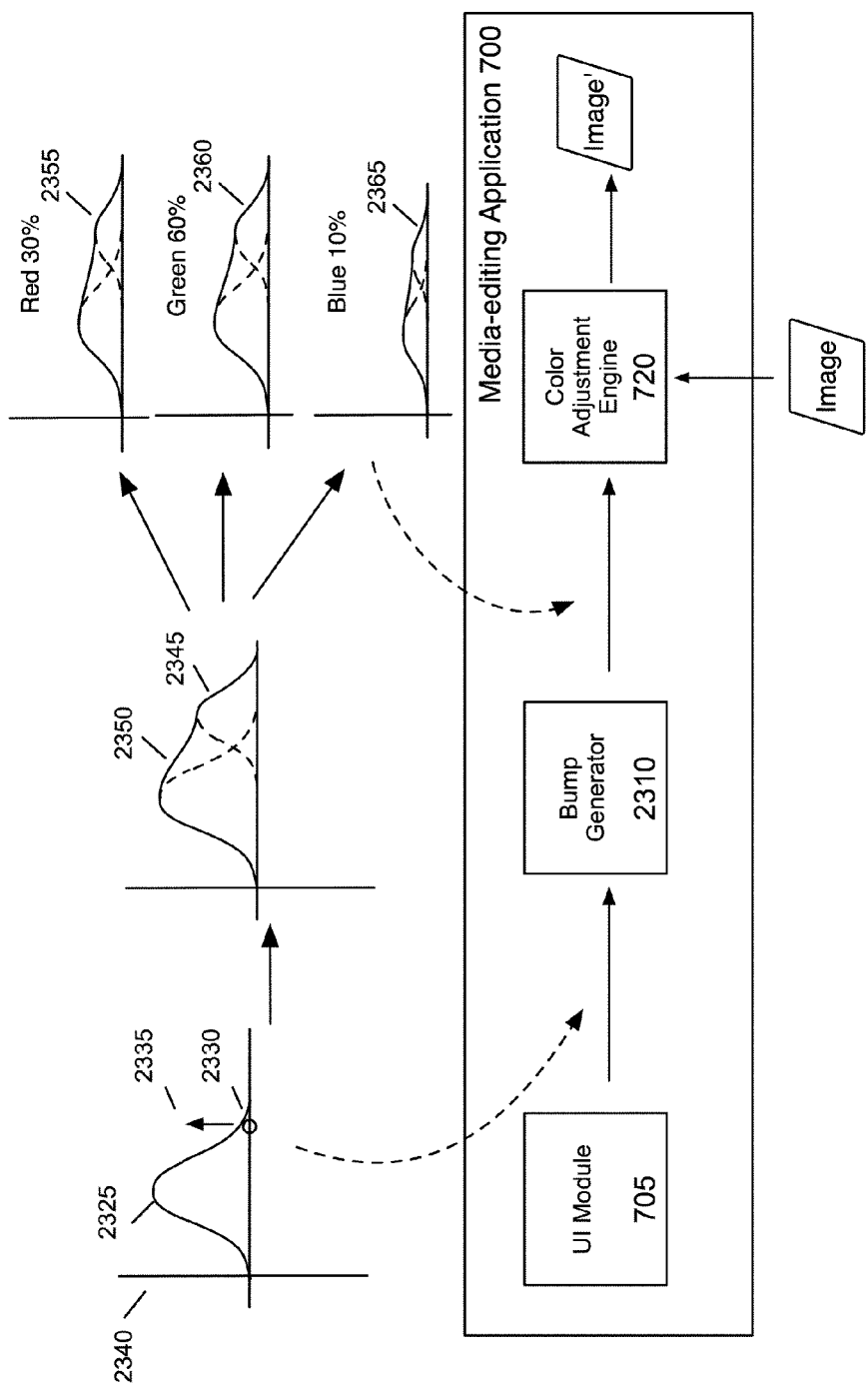
FIG. 23 illustrates a media editing application of some embodiments that allows a user to specify a custom color component for a tonal adjustment graph.

FIG. 23 illustrates a media editing application 700 of some embodiments that allows a user to specify a custom color component for a tonal adjustment graph and to edit the color values of an image by creating a set of basic bumps on the tonal adjustment graph. In addition, FIG. 23 illustrates an example of breaking down a composite bump associated with a custom color component into several curves for each of the primary color components. As shown, the media editing application 700 includes a UI module 705, a bump generator 2310, and a color adjustment engine 720. The UI module 705 receives user inputs provided on a tonal adjustment graph. In some embodiments, the user inputs include providing a selection of a baseline location on the tonal adjustment graph and providing a vector.

FIG. 23 illustrates a set of example user inputs on a tonal adjustment graph 2340. The tonal adjustment graph 2340 in this example has a tonal range that is defined along a custom color component. The custom color component is a composite of thirty percent of a red color component, sixty percent of a green color component, and ten percent of a blue color component. As shown, the user inputs include selecting a baseline location 2330 (i.e., a location on the horizontal axis of the tonal adjustment graph 2340) and providing a vector 2335. Based on the user inputs, the bump generator 2310 creates a basic bump on the tonal adjustment graph 2340. In this example, the bump generator 2310 creates a basic bump 2345 on the tonal adjustment graph 2340. In some embodiments, when there exists another bump on the tonal adjustment graph, the media editing application 700 generates a composite bump based on the basic bumps. Since another basic bump 2325 has been created on the tonal adjustment graph 2340 in FIG. 23, the bump generator 2310 generates a composite bump 2350 by blending the basic bumps 2325 and 2345.

The bump generator then breaks down the composite bump 2350 into several curves for each of the primary color components that have contributed to the custom color component. In this example, the application uses the composite bump 2350 to generate a curve for the red color component, a curve for the green color component, and a curve for the blue color component. In some of these embodiments, the application breaks down the composite bump 2350 according to the fractional contribution of each primary color component that makes up the custom color component. Thus, the bump generator 2310 generates a curve 2355 for the red color component by taking thirty percent of the composite bump 2350, generates a curve 2360 for the green color component by taking sixty percent of the composite bump 2350, and generates a curve 2365 for the blue color component by taking 10% percent of the composite bump 2350.

The bump generator 2310 then passes the curves 2350-2360 for the primary color components to the color adjustment engine 720. The color adjustment engine 720 receives an image and adjusts the color values of the image based on the curves 2350-2360 on the tonal adjustment graph.

Figure 24:
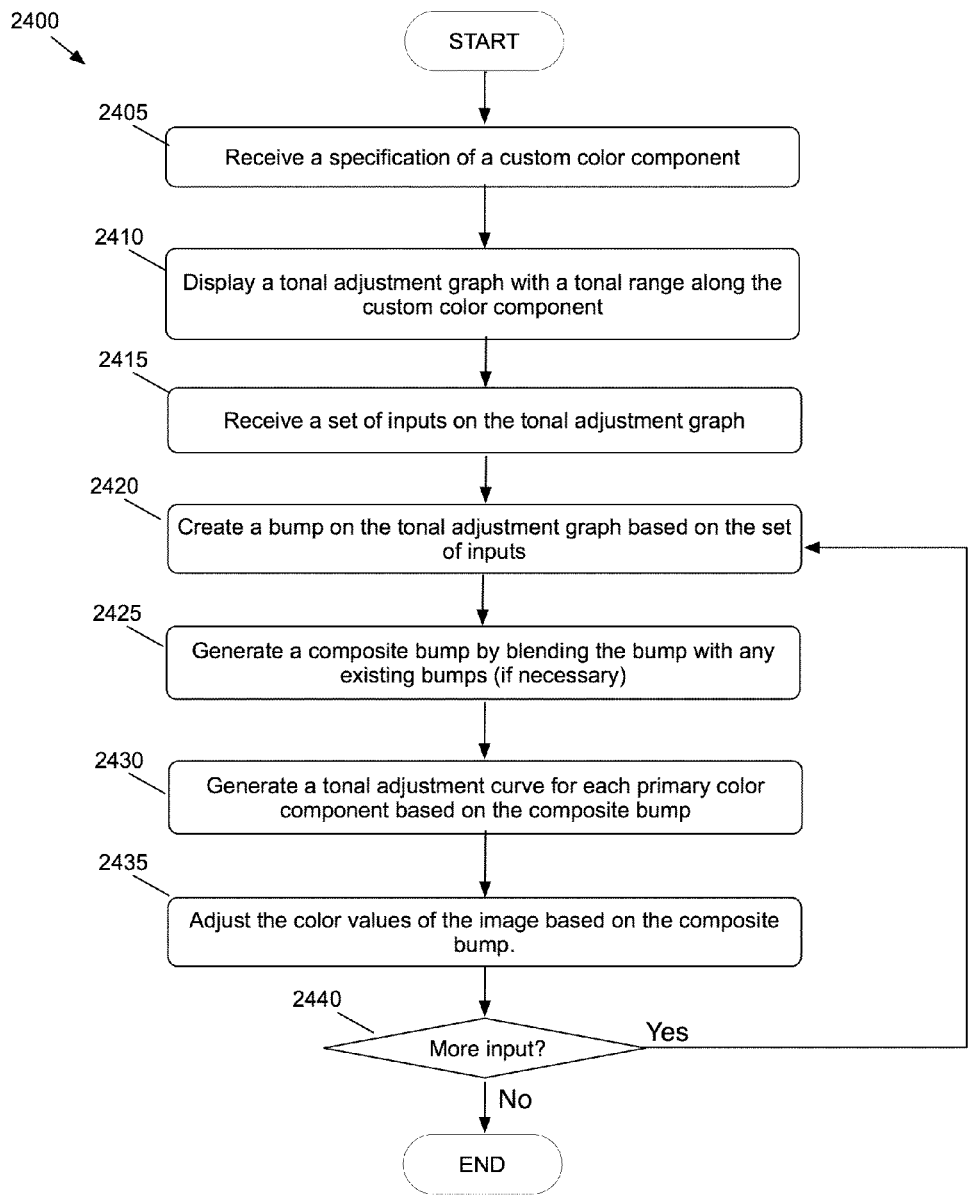
FIG. 24 conceptually illustrates a process for editing an image based on a bump on a tonal adjustment graph with a tonal range along a custom color component.

FIG. 24 conceptually illustrates a process 2400 for editing an image based on a bump on a tonal adjustment graph with a tonal range along a custom color component. In some embodiments, the process is performed by the media editing application 700. The process 2400 begins by receiving (at 2405) a specification of a custom color component. As mentioned above, different embodiments of the application allow the user to specify the custom color component in different manners. In some embodiments, the application provides a set of UI controls that are associated with the set of primary color components of a color space. In these embodiments, the user can specify a custom color component by manipulating the set of UI controls. In other embodiments, the user can specify a custom color component by selecting a location on a displayed image.

Next, the process displays (at 2410), for an image, a tonal adjustment graph with a tonal range along the specified custom color component. The process then receives (at 2415) a set of inputs on the tonal adjustment graphs. In some embodiments, the set of inputs includes selecting a baseline location on the tonal adjustment graph and providing a vector. Based on the received set of inputs, the process (at 2420) creates a basic bump on the tonal adjustment graph. In some embodiments, the application uses the selected baseline location as the center location of the basic bump. The application of some embodiments also uses the vector input to specify a height of the basic bump. As mentioned above, the basic bump corresponds different color values along the custom color component to different adjustment values on the tonal adjustment graph.

After creating a basic bump based on the user inputs, the process generates (at 2425) a composite bump on the tonal adjustment graph by blending the basic bump with any existing bumps if necessary. In some embodiments, when there exists one or more other bumps on the tonal adjustment graph, the process generates a composite bump by blending the newly created basic bump with the existing bumps. If there does not exist any other bump, the newly created bump is the composite bump for the tonal adjustment graph.

Next, the process generates (at 2430) a curve for each primary color component based on the composite bump. As mentioned above, a custom color component is a composite of more than one primary color component. Each primary color component contributes a specific fraction that makes up the custom color component. As such, the process divides (or breaks down) the composite bump into several curves according to the specific fraction for each primary color component that makes up the custom color component. In some embodiments, the process uses the same technique as illustrated above by reference to FIG. 23 to divide the composite bump. Each of the curves corresponds different color values along a primary color component to different adjustment values.

The process then adjusts (at 2435) the color values of the image using the set of curves generated for the primary color components. Next, the process determines (at 2440) whether there is any more input received on the tonal adjustment graph. If more inputs are received, the process returns to 2420 to create a new basic bump based on the newly received inputs. The process will cycle through operations 2420-2440 until no more inputs are received on the tonal adjustment graph. Then the process ends.

III. Software Architecture

Figure 25:
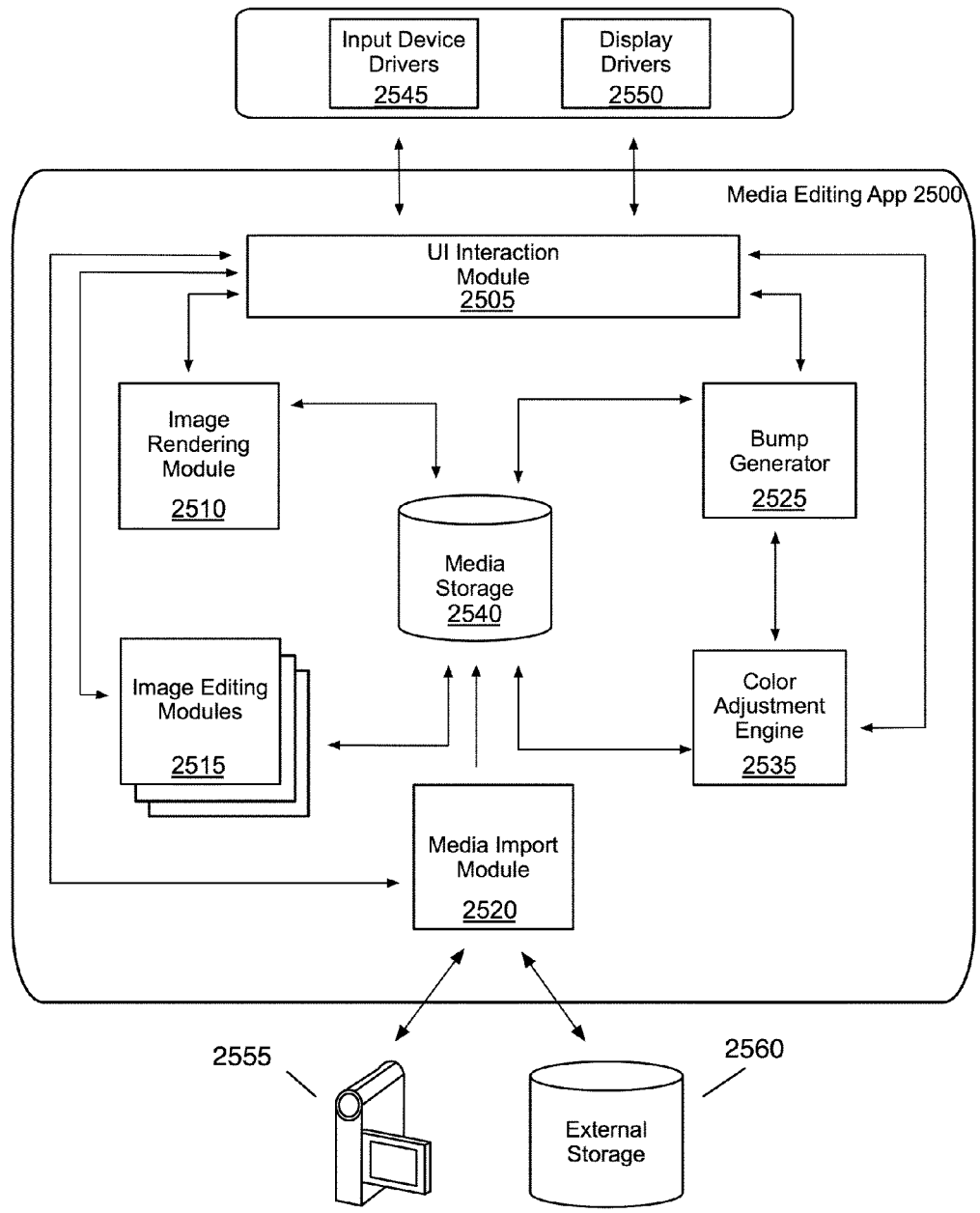
FIG. 25 conceptually illustrates the software architecture of a media editing application of some embodiments.

In some embodiments, the processes described above are implemented as software running on a particular machine, such as a computer or a handheld device, or stored in a machine readable medium. FIG. 25 conceptually illustrates the software architecture of a media editing application 2500 of some embodiments. Some examples of such media editing application include iPhoto®, iMovie® and Final Cut Pro®, all sold by Apple Inc.®

In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

As shown, the media editing application 2500 includes a user interface (UI) interaction module 2505, a video rendering module 2510, a set of video editing modules 2515, a media import module 2520, a bump generator 2525, and a color adjustment engine 2535. The application also includes a media storage 2540. In some embodiments, the media storage 2540 is a set of file folders organized by the media editing application and stored on a particular set of storage devices. The storage devices may include the boot drive of the electronic device on which the application operates, a different partition of that disk, a separate internal or external hard drive, a flash drive, SD card, etc.

The UI interaction module 2505 of the media editing application 2500 interprets the user input data received from the input device drivers 2545 and passes it to various modules, including the media editing modules 2515, the media import module 2520, the bump generator 2525, and the color adjustment engine 2535. In some embodiments, the input data directly affects the composite presentation data or other data stored in the media storage 2540.

The UI interaction module 2505 also manages the display of the UI, and outputs this display information to the display drivers 2550. This UI display information may be based on information from the various modules, including the video editing modules 2515, the video rendering module 2510, the media import module 2520, the color graphs generator 2525, and the color adjustment engine 2535.

The media import module 2520 imports media (e.g., an image, a video containing multiple picture frames, etc.) into the media editing application for use. Some embodiments, as shown, receive the media directly from a video capturing device such as a video camera 2555. Some embodiments import media from an external storage 2560. The external storage 2560 may be an SD card, a flash drive, an external hard drive, an internal hard drive in which the files are not stored in the organized file folder structure of the application, etc.

The bump generator 2525 creates basic bumps on a tonal adjustment graph based on user inputs that are received from the UI interaction module 2505. The bump generator 2525 also generates a composite bump by blending a set of basic bumps together on the tonal adjustment graph. In addition, when the tonal range of the tonal adjustment graph is defined along a custom color component, the bump generator 2525 also generates a curve on a tonal adjustment graph for each primary color component that contributes to the custom color component.

The color adjustment engine 2535 adjusts the color values of an image according to the bump that is generated by the bump generator 2525.

FIG. 25 also illustrates an operating system that includes input device driver(s) 2545 and display drivers 2550. In some embodiments, as illustrated, the device drivers 2545 and display drivers 2550 are part of the operating system even when the media editing application 2500 is an application separate from the operating system.

The input device drivers 2545 may include drivers for translating signals from a keyboard, mouse, touchpad, drawing tablet, touchscreen, etc. A user interacts with one or more of these input devices, which send signals to their corresponding device driver. The device driver then translates the signals into user input data that is provided to the UI interface interaction module 2505.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 26:
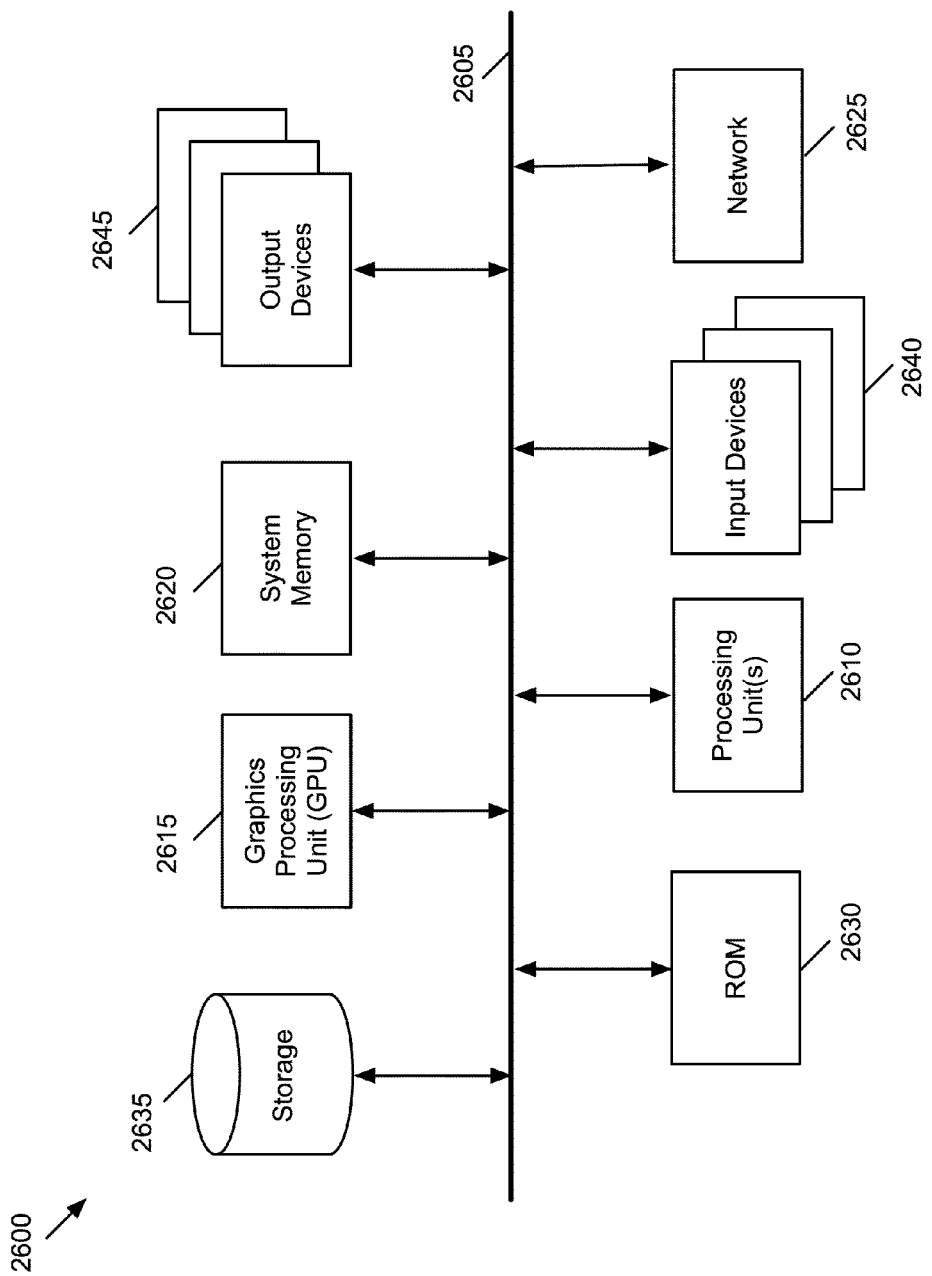
FIG. 26 conceptually illustrates an electronic system with which some embodiments of the invention are implemented.

FIG. 26 conceptually illustrates an electronic system 2600 with which some embodiments of the invention are implemented. The electronic system 2600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2600 includes a bus 2605, processing unit(s) 2610, a graphics processing unit (GPU) 2615, a system memory 2620, a network 2625, a read-only memory 2630, a permanent storage device 2635, input devices 2640, and output devices 2645.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2630, the GPU 2615, the system memory 2620, and the permanent storage device 2635.

From these various memory units, the processing unit(s) 2610 retrieves instructions to execute and data to process in order to execute the processes of the invention. The processing unit(s) may be a single processor or a multi-core processor in different embodiments. Some instructions are passed to and executed by the GPU 2615. The GPU 2615 can offload various computations or complement the image processing provided by the processing unit(s) 2610. In some embodiments, such functionality can be provided using CoreImage's kernel shading language.

The read-only-memory (ROM) 2630 stores static data and instructions that are needed by the processing unit(s) 2610 and other modules of the electronic system. The permanent storage device 2635, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2635.

Other embodiments use a removable storage device (such as a floppy disk, flash memory device, etc., and its corresponding disk drive) as the permanent storage device. Like the permanent storage device 2635, the system memory 2620 is a read-and-write memory device. However, unlike storage device 2635, the system memory 2620 is a volatile read-and-write memory, such a random access memory. The system memory 2620 stores some of the instructions and data that the processor needs at runtime. In some embodiments, the invention's processes are stored in the system memory 2620, the permanent storage device 2635, and/or the read-only memory 2630. For example, the various memory units include instructions for processing multimedia clips in accordance with some embodiments. From these various memory units, the processing unit(s) 2610 retrieves instructions to execute and data to process in order to execute the processes of some embodiments.

The bus 2605 also connects to the input and output devices 2640 and 2645. The input devices 2640 enable the user to communicate information and select commands to the electronic system. The input devices 2640 include alphanumeric keyboards and pointing devices (also called "cursor control devices"), cameras (e.g., webcams), microphones or similar devices for receiving voice commands, etc. The output devices 2645 display images generated by the electronic system or otherwise output data. The output devices 2645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 26, bus 2605 also couples electronic system 2600 to a network 2625 through a network adapter (not shown). In this manner, the computer can be a part of a network of computers (such as a local area network ("LAN"), a wide area network ("WAN"), or an Intranet, or a network of networks, such as the Internet. Any or all components of electronic system 2600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 8, 2, 12, 4, 13, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium having a computer program for execution by at least one processing unit, the computer program comprising sets of instructions for:
receiving a selection of a location on an image comprising a plurality of pixels, each pixel having a plurality of color values;
identifying a set of color values of a pixel that corresponds to the selected location on the image;
defining, based on the identified set of color values, a custom color component comprising a fractional contribution from each of a plurality of primary color components of a color space;
generating a response curve for the custom color component, the response curve mapping a set of input color values that are defined by reference to the custom color component to a set of output color values that are defined by reference to the custom color component;
modifying the response curve, by moving a selected portion of the curve, to modify the mapping of the set of input color values to the set of output color values; and
adjusting color values of the image based on the modified mapping of the set of input color values to the set of output color values.

2. The non-transitory machine readable medium of claim 1, wherein the plurality of primary color components comprises a red color component, a blue color component, and a green color component.

3. The non-transitory machine readable medium of claim 2, wherein the set of color values of the pixel comprises a color value that corresponds to the red color component, a color value that corresponds to the blue color component, and a color value that corresponds to the green color component.

4. The non-transitory machine readable medium of claim 1, wherein the custom color component comprises a range of sets of color values, wherein each set of color values in the range has a same ratio as that of the set of color values of the pixel.

5. The non-transitory machine readable medium of claim 1, wherein the computer program further comprises a set of instructions for generating at least one other response curve for a primary color component, the other response curve mapping a set of input color values that are defined by reference to the primary color component to a set of output color values that are defined by reference to the primary color component.

6. The non-transitory machine readable medium of claim 1, wherein the computer program further comprises sets of instructions for:
receiving a manipulation of the response curve; and
based on the manipulation of the response curve, further adjusting color values of the image.

7. A non-transitory machine readable medium having a computer program which when executed by at least one processing unit adjusts color values of an image, the computer program comprising sets of instructions for:
displaying, in a display area, an image represented in a color space comprising a plurality of primary color components;
receiving a specification of a custom color component that is a composite of two or more of the plurality of primary color components;
generating a response graph for the custom color component, the response graph mapping input color values that are defined by reference to the custom color component to output color values that are defined by reference to the custom color component;
receiving a manipulation on the response graph by moving a selected portion of the graph in order to modify the mapping of the set of input color values to the set of output color values; and
adjusting color values of the image based on the modified mapping of the set of input color values to the set of output color values.

8. The non-transitory machine readable medium of claim 7, wherein the set of instructions for receiving the specification comprises a set of instructions for receiving a selection of a location of the image.

9. The non-transitory machine readable medium of claim 8, the program further comprising a set of instructions for identifying the primary color components from a set of color values of a pixel that corresponds to the selected location on the image.

10. The non-transitory machine readable medium of claim 7, wherein the set of instructions for receiving the specification comprises a set of instructions for receiving selection of locations of a plurality of range sliders that each is associated with one of the primary color components.

11. The non-transitory machine readable medium of claim 10, the program further comprising a set of instructions for identifying a plurality of color values that correspond to the selected locations.

12. The non-transitory machine readable medium of claim 11, the program further comprising a set of instructions for identifying the specification of the custom color component based on the identified color values.

13. A method of providing a media editing application for adjusting color values of an image represented in a color space, the method comprising:
providing a custom color component composer for:
receiving a selection of a location on an image;
identifying a set of color values of a pixel that corresponds to the selected location on the image; and
defining, based on the identified set of color values, a custom color component that comprises a fractional contribution from each of a plurality of primary color components of a color space; and
providing a curve editor for:
generating a response curve for the custom color component, the response curve mapping a set of input color values that are defined by reference to the custom color component to a set of output color values that are defined by reference to the custom color component;
modifying the response curve, by moving a selected portion of the curve, to modify the mapping of the set of input color values to the set of output color values; and
adjusting color values of the image based on the modified mapping of the set of input color values to the set of output color values.

14. The method of claim 13, wherein the plurality of primary color components comprises a red color component, a blue color component, and a green color component.

15. The method of claim 14, wherein the set of color values of the pixel comprises a color value that corresponds to the red color component, a color value that corresponds to the blue color component, and a color value that corresponds to the green color component.

16. The method of claim 13, wherein the custom color component comprises a range of sets of color values, wherein each set of color values in the range has a same ratio as that of the set of color values of the pixel.

17. The method of claim 13, wherein the curve editor is further for:
  receiving a manipulation of the response curve; and
  based on the manipulation of the response curve, further adjusting color values of the image.

18. A method of providing an application for adjusting color values of an image represented in a color space, the method comprising:
  providing a first user interface (UI) for receiving a specification of a custom color component comprising at least one of a plurality of primary color components;
  providing a graph generator for generating a response graph for the custom color component, the response graph mapping input color values that are defined by reference to the custom color component to output color values that are defined by reference to the custom color component;
  providing a second UI for receiving a manipulation on the response graph by moving a selected portion of the graph in order to modify the mapping of the set of input color values to the set of output color values; and
  providing a color adjuster for adjusting the color values of the image based on the modified mapping of the set of input color values to the set of output color values.

19. The method of claim 18, wherein the first UI is further for receiving a selection of a location of the image.

20. The method of claim 19, wherein the first UI is further for identifying a set of color values of a pixel that corresponds to the selected location on the image.

21. The method of claim 18, wherein the first UI is further for receiving selection of locations of a plurality of range sliders that each is associated with one of the primary color components.

22. The method of claim 21, wherein the first UI is further for identifying a plurality of color values that correspond to the selected locations.

23. The method of claim 22, wherein the first UI identifies the specification of the custom color component based on the identified color values.

* * * * *